US012741695B2

(12) United States Patent
He et al.

(10) Patent No.: US 12,741,695 B2
(45) **Date of Patent: *Sep. 22, 2026**

(54) OFF-ROAD VEHICLE

(71) Applicant: Zhejiang CFMOTO Power Co., Ltd., Hangzhou (CN)

(72) Inventors: An He, Hangzhou (CN); Lihua Rao, Hangzhou (CN); Jianyong Wang, Hangzhou (CN); Xiayang Hu, Hangzhou (CN)

(73) Assignee: Zhejiang CFMOTO Power Co., Ltd., Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/017,414

(22) Filed: Jan. 10, 2025

(65) Prior Publication Data

US 2025/0145222 A1 May 8, 2025

Related U.S. Application Data

(63) Continuation of application No. 17/986,926, filed on Nov. 15, 2022, now Pat. No. 12,391,314, which is a (Continued)

(51) Int. Cl.
*B62D 21/18* (2006.01)
*B60G 3/26* (2006.01)
(Continued)

(52) U.S. Cl.
CPC ............. *B62D 21/183* (2013.01); *B60G 3/26* (2013.01); *B60G 7/02* (2013.01); *B60G 21/0551* (2013.01);
(Continued)

(58) Field of Classification Search
CPC .......... B62D 21/183; B60G 3/26; B60G 7/02; B60G 2200/44; B60G 2200/462;
(Continued)

(56) References Cited

U.S. PATENT DOCUMENTS 3,743,045 A 7/1973 Hansen
3,917,306 A * 11/1975 Madler .................. B60G 21/04
280/124.109

(Continued)

FOREIGN PATENT DOCUMENTS

CN 103387012 A 11/2013
CN 103807077 A 5/2014

(Continued)

OTHER PUBLICATIONS

European Patent Office, Supplemental European Search Report, App. No. 21 94 4412, Jun. 29, 2023.

*Primary Examiner* — Jason D Shanske
*Assistant Examiner* — Matthew Joseph Ganci
(74) *Attorney, Agent, or Firm* — Shewchuk IP Services, LLC; Jeffrey D. Shewchuk

(57) ABSTRACT

An off-road vehicle includes a frame; front and rear wheels; a front suspension assembly; a front torsion bar assembly, a rear suspension assembly and a rear torsion bar assembly. The front suspension assembly comprises a front lower rocker arm, a front upper rocker arm, and a front wheel shaft support assembly mounted between the front lower and the front upper rocker arms. The front torsion bar assembly is located above the front upper rocker arm, and is movably connected to the front upper rocker arm. The rear suspension assembly comprises a rear lower rocker arm, a rear upper rocker arm, a control arm assembly, and a rear wheel shaft support assembly mounted between the rear lower and rear upper rocker arms. The rear torsion bar assembly is located between the rear upper and lower rocker arms, and is movably connected to the rear upper rocker arm.

20 Claims, 26 Drawing Sheets

Related U.S. Application Data continuation of application No. PCT/CN2021/121822, filed on Sep. 29, 2021.

(51) Int. Cl.
*B60G 7/02* (2006.01)
*B60G 21/055* (2006.01)
*B62D 33/06* (2006.01)

(52) U.S. Cl.
CPC ...... *B62D 33/0625* (2013.01); *B60G 2200/44* (2013.01); *B60G 2200/462* (2013.01)

(58) Field of Classification Search
CPC .............. B60G 2204/129; B60G 7/001; B60G 2200/144; B60G 3/20; B60G 21/055; B60G 2202/135; B60G 2204/1224; B60G 2300/07
See application file for complete search history.

(56) References Cited

U.S. PATENT DOCUMENTS

| | | | | |
|---|---|---|---|---|
| 8,998,253 | B2 | 4/2015 | Novotny et al. | |
| 9,776,481 | B2 | 10/2017 | Deckard et al. | |
| 10,960,941 | B2 | 3/2021 | Endrizzi et al. | |
| 11,130,378 | B1 | 9/2021 | Lambert | |
| 11,648,813 | B2 | 5/2023 | Li et al. | |
| 12,391,314 | B2 * | 8/2025 | He | B60G 3/26 |
| 2011/0240397 | A1 | 10/2011 | Shiina et al. | |
| 2015/0061275 | A1 | 3/2015 | Deckard et al. | |
| 2016/0059895 | A1 | 3/2016 | Kariniemi | |
| 2016/0229479 | A1 | 8/2016 | Mori | |
| 2016/0236737 | A1 | 8/2016 | Spindler et al. | |
| 2018/0215223 | A1 | 8/2018 | Mailhot et al. | |
| 2019/0300064 | A1 | 10/2019 | Hisamura et al. | |
| 2020/0282788 | A1 | 9/2020 | Wolf-Monheim et al. | |
| 2021/0031713 | A1 | 2/2021 | Kotrla | |
| 2021/0268863 | A1 | 9/2021 | Deckard et al. | |
| 2022/0099055 | A1 | 3/2022 | Que et al. | |

FOREIGN PATENT DOCUMENTS

| | | | |
|---|---|---|---|
| CN | 105508597 | A | 4/2016 |
| CN | 207018117 | U | 2/2018 |
| CN | 106240266 | B | 4/2019 |
| CN | 208816254 | U | 5/2019 |
| CN | 111770876 | A | 10/2020 |
| CN | 112722083 | A | 4/2021 |
| CN | 112758185 | A | 5/2021 |
| CN | 112918208 | A | 6/2021 |
| CN | 214028353 | U | 8/2021 |
| CN | 113335439 | A | 9/2021 |
| CN | 113386867 | A | 9/2021 |
| JP | 2007182116 | A | 7/2007 |
| JP | 2010168043 | A | 8/2010 |
| WO | 2014130611 | A2 | 8/2014 |

* cited by examiner 2031e
2031z
2031j
2031f
2031k
2031h
2031g
2031i

Z
P
Q
$\beta_1$
$\beta_2$
$\beta_5$
$\beta_3$
$\beta_4$
$\beta_6$
$A_1$

OFF-ROAD VEHICLE

RELATED APPLICATION INFORMATION

The present application is a continuation of U.S. patent application Ser. No. 17/986,926, filed Nov. 15, 2022, now U.S. Pat. No. 12,391,314, which was a continuation of PCT/CN2021/121822 filed Sep. 29, 2021. The entire contents of the above-referenced applications are incorporated herein by reference.

FIELD OF THE DISCLOSURE

The disclosure relates to the technical field of off-road vehicles.

BACKGROUND OF THE DISCLOSURE

Off-road vehicles are designed for use on various types of rough terrain, rather than just on pavement. Off-road vehicles can also be used for sporting (on or off pavement), as well as for freight transportation. Off-road vehicles have a broad market due to their comprehensive functions. A four wheeled off-road vehicle basically includes a frame, a front suspension assembly, a rear suspension assembly, two front wheels and two rear wheels. The front suspension assembly is mounted at the front end of the frame, and the rear suspension assembly is mounted at the rear end of the frame. The front suspension assembly and the rear suspension assembly jointly provide shock absorption to the front and rear ends of the frame to improve the comfort of the driver and any passengers in the off-road vehicle. The front wheels are mounted on the front suspension assembly, and the rear wheels are mounted on the rear suspension assembly. The front suspension assembly may generally include a front torsion bar, which generates a reaction force on an opposing side of the front suspension assembly after a force is applied to one of the front wheels. The reaction force helps maintain the front wheels at substantially the same height, to prevent the vehicle from leaning and to assist the steering of the vehicle at the same time. However, existing installation positions and layouts of front torsion bars cause the reaction force generated by the front torsion bar to be delivered more indirectly and slowly than ideal. The indirect and delayed application of the reaction force damages the stability of the off-road vehicle.

SUMMARY OF THE DISCLOSURE

An off-road vehicle with good stability and smooth running is provided to solve the above problems.

An off-road vehicle includes a frame, front and rear wheels, a front suspension assembly and a rear suspension assembly. The frame can be viewed as having a front frame portion located at the front end of the off-road vehicle and a rear frame portion located at the rear end of the off-road vehicle. The front wheels include a left-front wheel and a right-front wheel. The rear wheels include a left-rear wheel and a right-rear wheel. The front suspension assembly is mounted on the front frame portion, with each side including a lower rocker arm, an upper rocker arm, a front shock absorber, and a front wheel shaft support assembly disposed between the lower rocker arm and the upper rocker arm. The rear suspension assembly is mounted on the rear frame portion, with each side including a lower rocker arm, an upper rocker arm, a control arm, a rear shock absorber, and a rear wheel shaft support assembly disposed between the rear lower rocker arm and the rear upper rocker arm. Both the front suspension assembly and the rear suspension assembly further include a torsion bar assembly. The front torsion bar assembly is rotatably mounted on the front frame portion and at least partially located above the front upper rocker arms and movably connected by links to the front upper rocker arms. The rear control arms are at an elevation between the lower and upper rear rocker arms, with one end of the control arm rotatably connected to the rear wheel shaft support assembly, and the other end rotatably connected to the rear frame portion. The rear torsion bar assembly is located between the lower and upper rear rocker arms, movably connected to the rear upper rocker arms. Each torsion bar assembly includes a torsion bar and two mounting seats fixed on the frame.

BRIEF DESCRIPTION OF THE DRAWINGS

FIG. 31 is a side view of the electrical terminal assembly of FIG. 30 with the cover on.

DETAILED DESCRIPTION

For better understanding of the above objects, features and advantages of the present disclosure, the embodiments of the present disclosure will be described in detail below with reference to the accompanying drawings. In the following description, numerous details are set forth in order to for better understanding of the present disclosure. However, the present disclosure may be implemented in many other ways different from those described herein, and those skilled in the art can make similar improvements without departing from the teachings of the present disclosure. Therefore, the present invention is not limited by specifics of the embodiments disclosed below.

Figure 1:
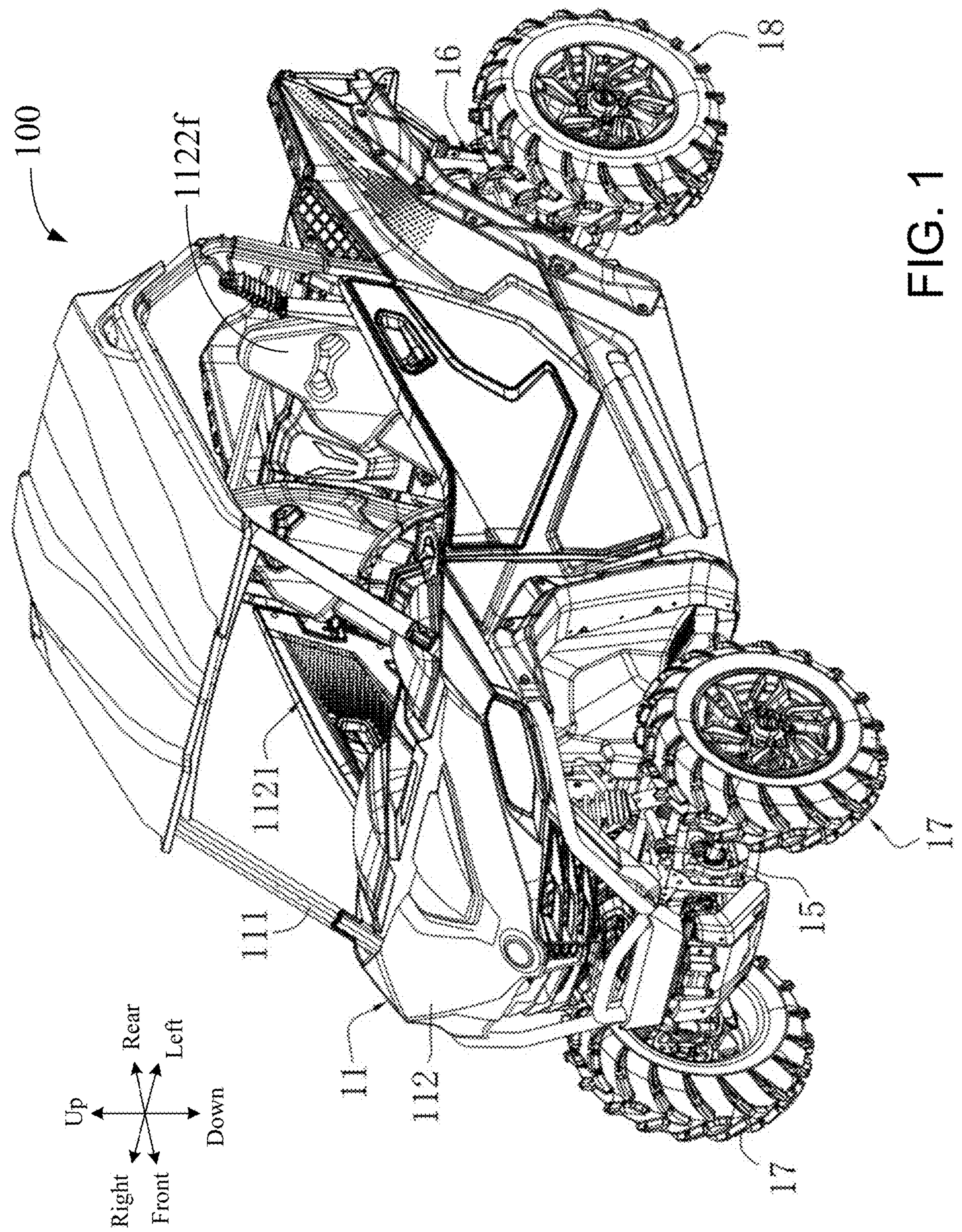
FIG. 1 is a front perspective view of an off-road vehicle according to a preferred embodiment of the disclosure.

FIG. 1 shows an off-road vehicle 100, which may be used for travel on a wide variety of unpaved surfaces including beaches, hillsides and deserts. The general orientations of front, rear, up (upper), down (lower), left and right for the off-road vehicle 100 are defined in FIG. 1. The off-road vehicle 100 includes a frame assembly 11, a front suspension assembly 15, a rear suspension assembly 16, two front wheels 17, and two rear wheels 18. The frame assembly 11 is used for carrying and connecting various components on the off-road vehicle 100 and bearing various loads from inside and outside the vehicle. The front suspension assembly 15 is disposed toward the front of the off-road vehicle 100 and is mounted on the frame assembly 11. The front suspension assembly 15 is connected to the front wheels 17 so as to deliver forces from the front wheels 17 to the frame assembly 11. The rear suspension assembly 16 is disposed toward the rear of the off-road vehicle 100, and is mounted on the frame assembly 11. The rear suspension assembly 16 is connected to the rear wheels 18 so as to deliver forces from the rear wheels 18 to the frame assembly 11. The front suspension assembly 15 and the rear suspension assembly 16 collectively are capable of buffering impact forces from uneven surfaces over which the vehicle 100 travels to the frame assembly 11 and other components, so as to reduce vibration, thereby ensuring that the off-road vehicle 100 is able to run smoothly and stably.

The frame assembly 11 preferably includes a frame 111 and a vehicle body 112, with the front suspension assembly 15 and the rear suspension assembly 16 respectively mounted on the front and rear ends of the frame 111. The vehicle body 112 is mounted on the frame 111 and covers at least part of the frame 111, so as to protect various parts and components on the vehicle 100 and improve the aesthetics of the vehicle 100. The preferred layout of the vehicle 100 defines a driving place for the driver and a place for accommodating a passenger in a side-by-side arrangement, as well as a place to carry cargo.

Figure 4:
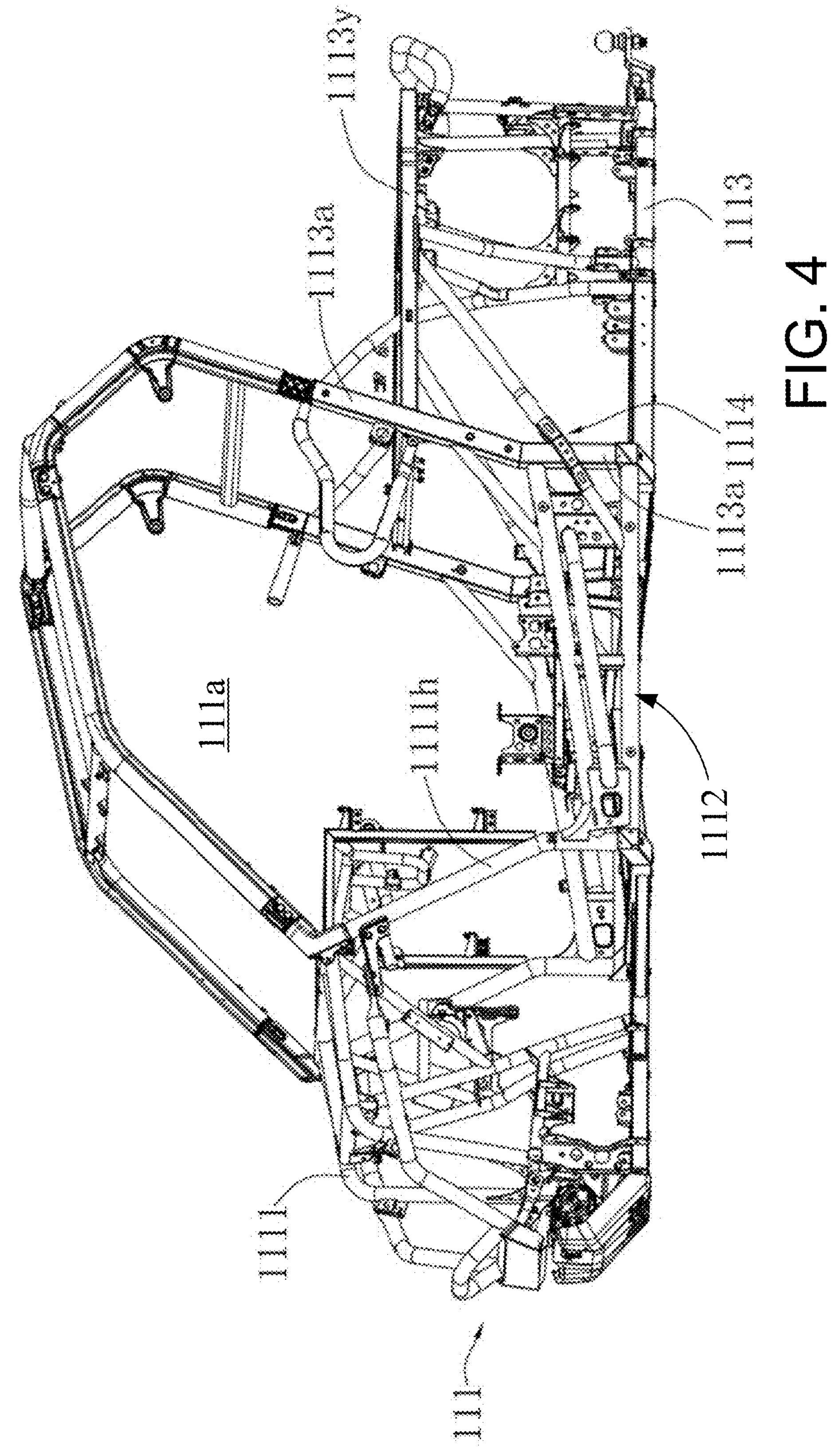
FIG. 4 is a mostly side, slightly in perspective view of the frame structure of the vehicle of FIG. 1.

Referring to FIG. 4, the frame 111 can be conceptually divided into a front frame portion 1111, a middle frame portion 1112, and a rear frame portion 1113. The front frame portion 1111 carries components such as the front suspension assembly 15, headlights, water tanks, and the like. The rear frame portion 1113 carries components such as the rear suspension assembly 16, taillights and other components. The middle frame portion 1112 extends between the front frame portion 111 and the rear frame portion 113 and defines an accommodating space **111*a* for a cabin 1121. The cabin 1121** serves as a cockpit for drivers and/or passenger compartment for passengers.

Figure 6:
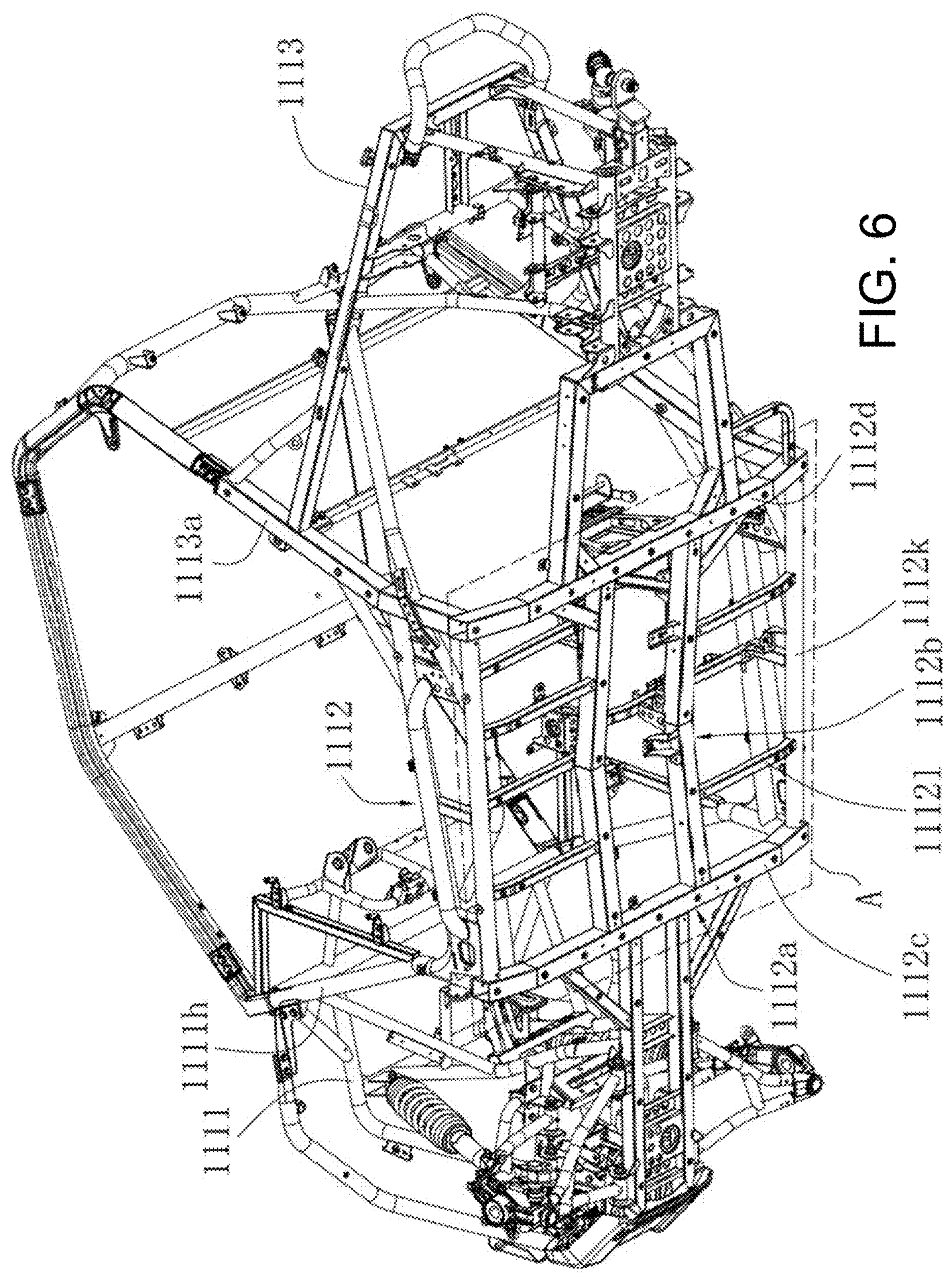
FIG. 6 is a perspective view from below of the frame of FIGS. 4 and 5.
Figure 7:
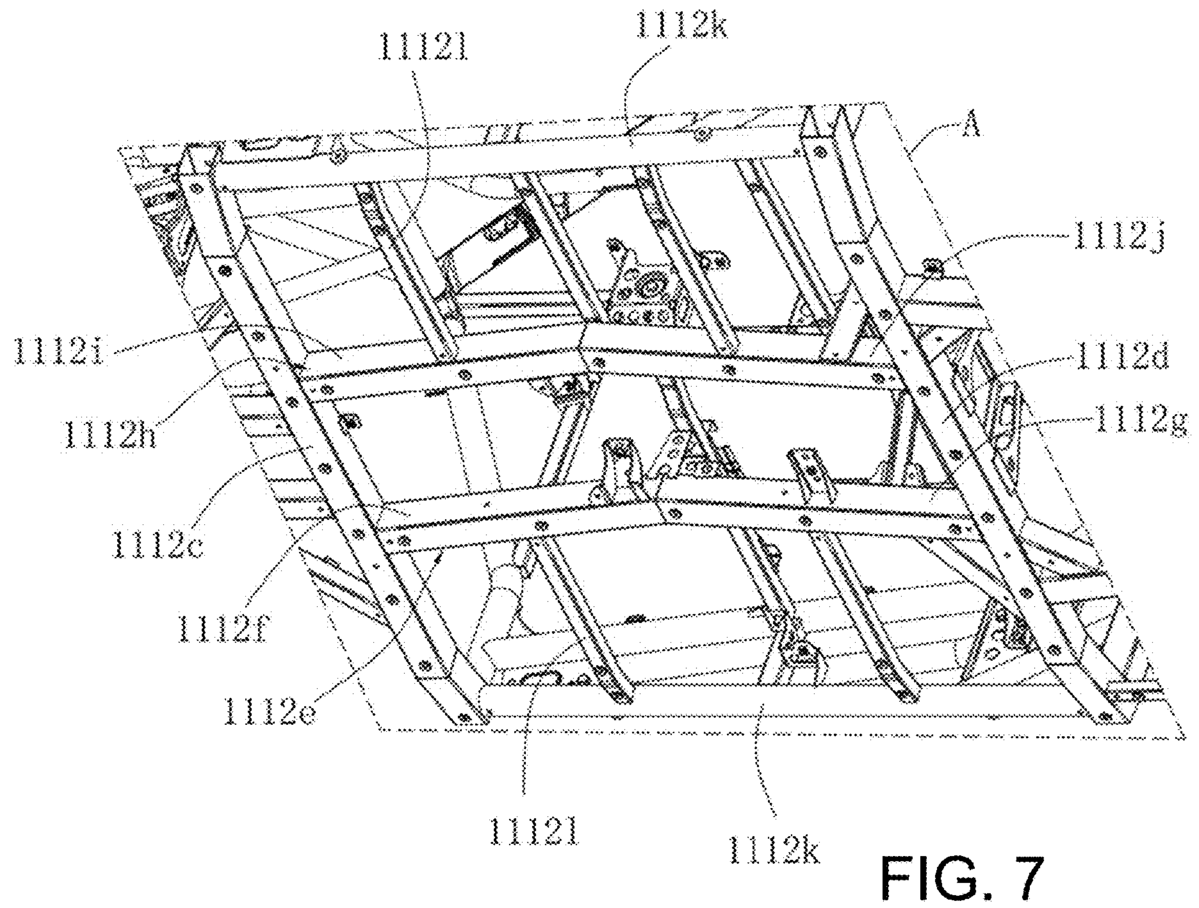
FIG. 7 is an enlarged view of part A in FIG. 6.
Figure 8:
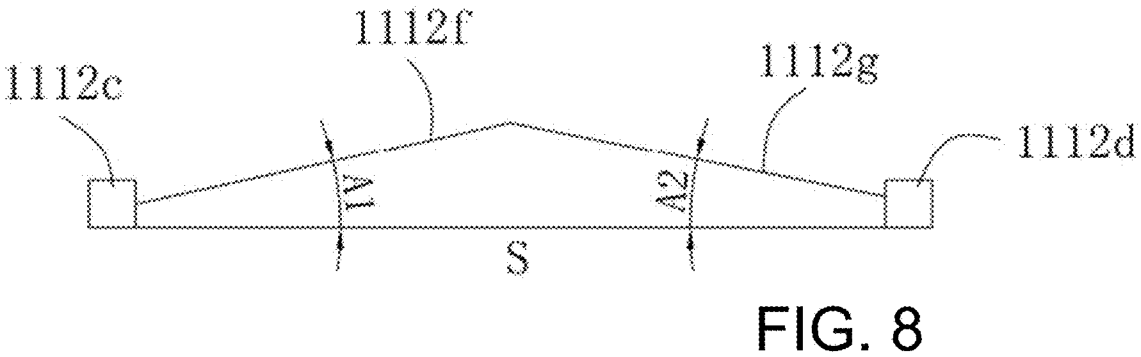
FIG. 8 is a side schematic view of the preferred middle frame portion.

As further shown in FIGS. 6 to 8, the middle frame portion 1112 includes horizontal beams **1112*a* and sloping beams 1112*b*. The horizontal beams 1112*a* and the sloping beams 1112*b* are interconnected to substantially form a load bearing structure. In one embodiment, the number of horizontal beams 1112*a* may be greater than one, and a plurality of the horizontal beams 1112*a* may be spaced apart and substantially located on the same plane. The number of sloping beams 1112*b* may also be greater than one, and a plurality of the sloping beams 1112*b* may be arranged between the plurality of the horizontal beams 1112*a* at intervals. It should be noted that the number of the horizontal beams 1112*a* may be two, three, four, or the like. Similarly, the number of the sloping beams 1112*b* may be two, three, four, or the like, i.e., the numbers of horizontal beams 1112*a* and sloping beams 1112*b*** may be selected to correspond to the particular design objectives.

In this embodiment, the horizontal beams **1112*a* include a front cross beam 1112*c* and a rear cross beam 1112*d*, and the front cross beam 1112*c* and the rear cross beam 1112*d* are substantially located at the same elevation in the same plane S. The sloping beams 1112*b* include a right longitudinal beam 1112*e* and a left longitudinal beam 1112*h*. The right longitudinal beam 1112*e* may be provided to the right and the left longitudinal beam 1112*h* may be provided to the left of the longitudinal center line of the off-road vehicle 100. The right longitudinal beam 1112*e* preferably includes a leading rod 1112*f* and a trailing rod 1112*g*. The left longitudinal beam 1112*h* preferably includes a leading rod 1112*i* and a trailing rod 1112*j*. One end of each leading rod 1112*f*, 1112*i* is connected to the front cross beam 1112*c*, and the other end of each leading rod 1112*f*, 1112*i* extends toward the rear cross beam 1112*d*. An angle between each leading rod 1112*f*, 1112*i* and the plane S is defined in FIG. 8 as A1, and A1 is preferably in the range from 5° to 15°. One end of each trailing rod 1112*g*, 1112*j* is connected to the rear cross beam 1112*d*, and the other end of each trailing rod 1112*g*, 1112*j* extends toward the front cross beam 1112*c* and is connected to the corresponding leading rod 1112*f*, 1112*i*. An angle between the trailing rod 1112*g* and the plane S is defined in FIG. 8 as A2, and A2 is preferably in the range from 5° to 15°, so that the bottom of the middle frame portion 112 is raised upwardly away from the horizontal plane and defines a peak. The distance of the off-road vehicle 100 from the underlying ground is increased under a central portion of the frame 111, so that the ability of the off-road vehicle 100** to traverse over obstacles is effectively improved.

In one embodiment, the angle A1 is larger than the angle A2, locating the peak forward of the midpoint between the front cross beam **1112*c* and the rear cross beam 1112*d*. The horizontal beams 1112*a* and the sloping beams 1112*b* are preferably made of steel pipes, which are readily commercially available and are easily processed. The leading rods 1112***f*, 1112*i* may be welded or otherwise attached to the front cross beam 1112*c*, and the trailing rods 1112*g*, 1112*j* may be welded or otherwise attached to the rear cross beam 1112*d*. The leading rods 1112*f*, 1112*i* may be welded or otherwise attached to the trailing rods 1112*g*, 1112*j*. Alternatively, other connection methods may be used. The leading rods 1112*f*, 1112*i* of the sloping beams 1112*b* are preferably parallel to each other, and the trailing rods 1112*g*, 1112*j* of the sloping beams 1112*b* are preferably arranged parallel to each other.

As also called out in FIGS. 6 and 7, the middle frame portion 1112 preferably includes at least two longitudinal reinforcement pipes 1112*k* and a plurality of cross reinforcement pipes 1112*l*. In the most preferred embodiment shown, the middle frame portion 1112 includes two longitudinal reinforcement pipes 1112*k* spaced apart with the sloping beams 1112*b* between the two longitudinal reinforcement pipes 1112*k*. One end of each longitudinal reinforcement pipe 1112*k* is fixed on the front cross beam 1112*c*, and the other end is fixed on the rear cross beam 1112*d*. Each cross reinforcement pipe 1112*l* is connected between one of the sloping beams 1112*b* and the corresponding longitudinal reinforcement pipe 1112*k*. Thus, the longitudinal reinforcement pipes 1112*k*, the cross reinforcement pipes 1112*l*, the horizontal beams 1112*a* and the sloping beams 1112*b* together form a mesh-like structure, which effectively improves the structural strength and bearing capacity of the entire middle frame portion 1112.

Referring back to FIGS. 4 and 5, the front frame portion 1111 preferably further includes two first pillars 1111*h* commonly called A-pillars, and the rear frame portion 1113 preferably further includes two second pillars 1113*a* commonly called B-pillars. The A-pillars 1111*h* and the B-pillars 1113*a* are used for bearing, supporting the vehicle, and protecting drivers and passengers. A bottom end of each A-pillar 1111*h* preferably connects to the front cross beam 1112*c*, with the A-pillar 1111*h* extending upwardly therefrom. A bottom end of each B-pillar 1113*a* preferably connects to the rear cross beam 1112*d*, with the B-pillar 1113*a* extending upwardly therefrom.

As called out in FIGS. 4, 5, 9 and 10, the preferred embodiment includes two reinforcement structures 1114 arranged between the rear frame portion 1113 and the middle frame portion 1112 to improve the connection strength between the rear frame portion 1113 and the middle frame portion 1112. Each reinforcement structure 1114 preferably includes a first reinforcement rod 1114*a*, a second reinforcement rod 1114*b* and a reinforcement plate 1114*c*. Each first reinforcement rod 1114*a* is connected between one of the longitudinal reinforcement pipes 1112*k* and one of the B-pillars 1113*a*. Each second reinforcement rod 1114*b* is connected between one of the B-pillars 1113*a* and a support bracket 1113*y*. Each reinforcement plate 1114*c* is connected to both the first reinforcement rod 1114*a* and the second reinforcement rod 1114*b*, extending outside its B-pillar 1113*a*. Forces applied to the B-pillars 1113*a* by the first reinforcement rod 1114*a* and the second reinforcement rod 1114*b* are distributed by the reinforcement plate 1114*c*, avoiding processes such as drilling holes in the two B-pillars 1113*a*, thereby reducing the possibility of local deformation of the B-pillars 1113*a*. Other structures may alternatively or additionally be used to connect the A- and B-pillars, cross beams and/or longitudinal beams.

Connections for the reinforcement structure may be by welding. The reinforcement plate 1114*c* may be integrally formed by stamping. Ends of the reinforcement plate 1114*c* preferably include reinforcement pieces 1114*d* abutting against and increasing the contact area between the reinforcement plate 1114*c* and the first reinforcement rod 1114*a* and the second reinforcement rod 1114*b*, thereby improving the connection strength between the reinforcement plate 1114*c* and the first reinforcement rod 1114*a* and the second reinforcement rod 1114*b*.

Figure 2:
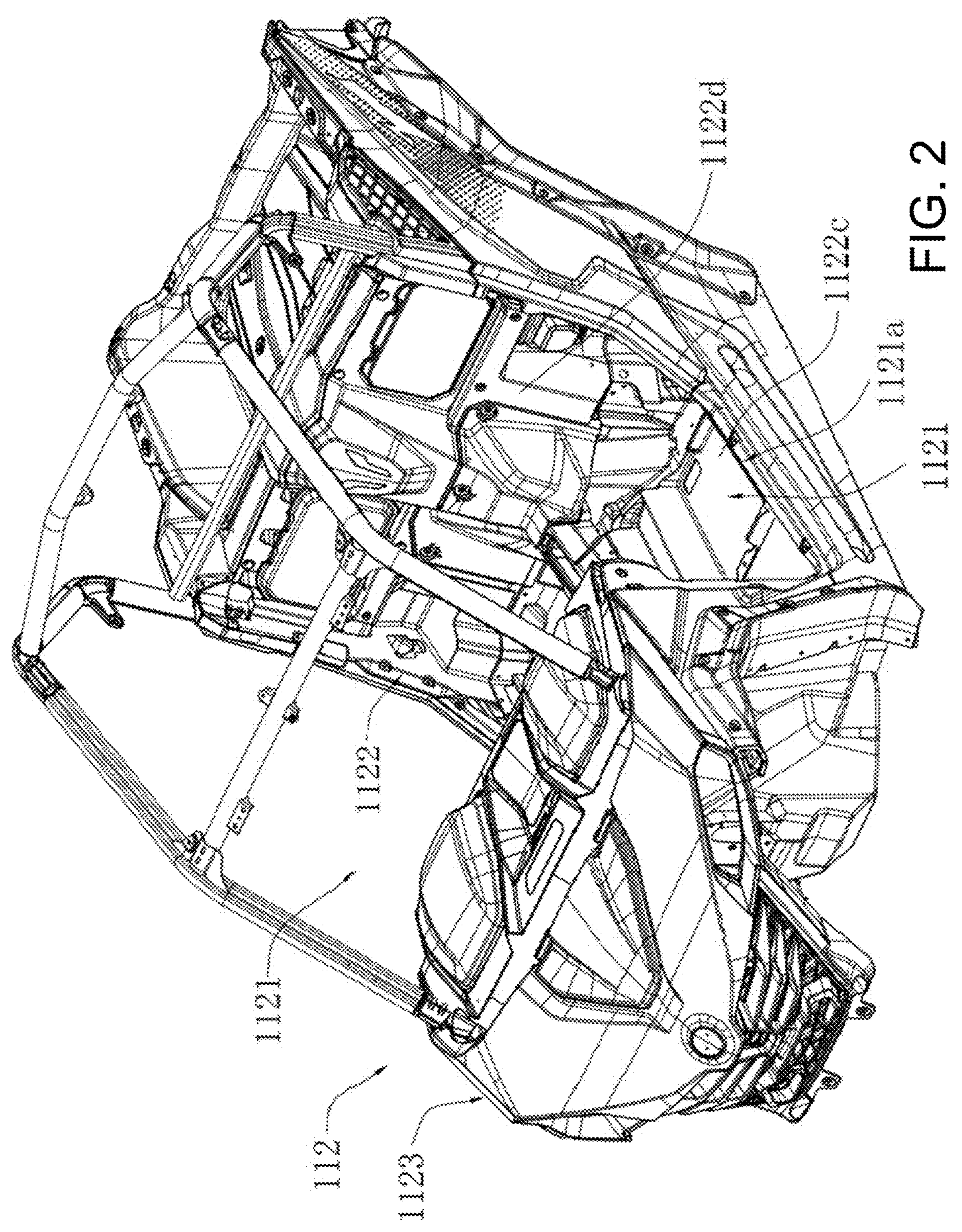
FIG. 2 is a front perspective view of the body and roll cage structure of the vehicle of FIG. 1.
Figure 3:
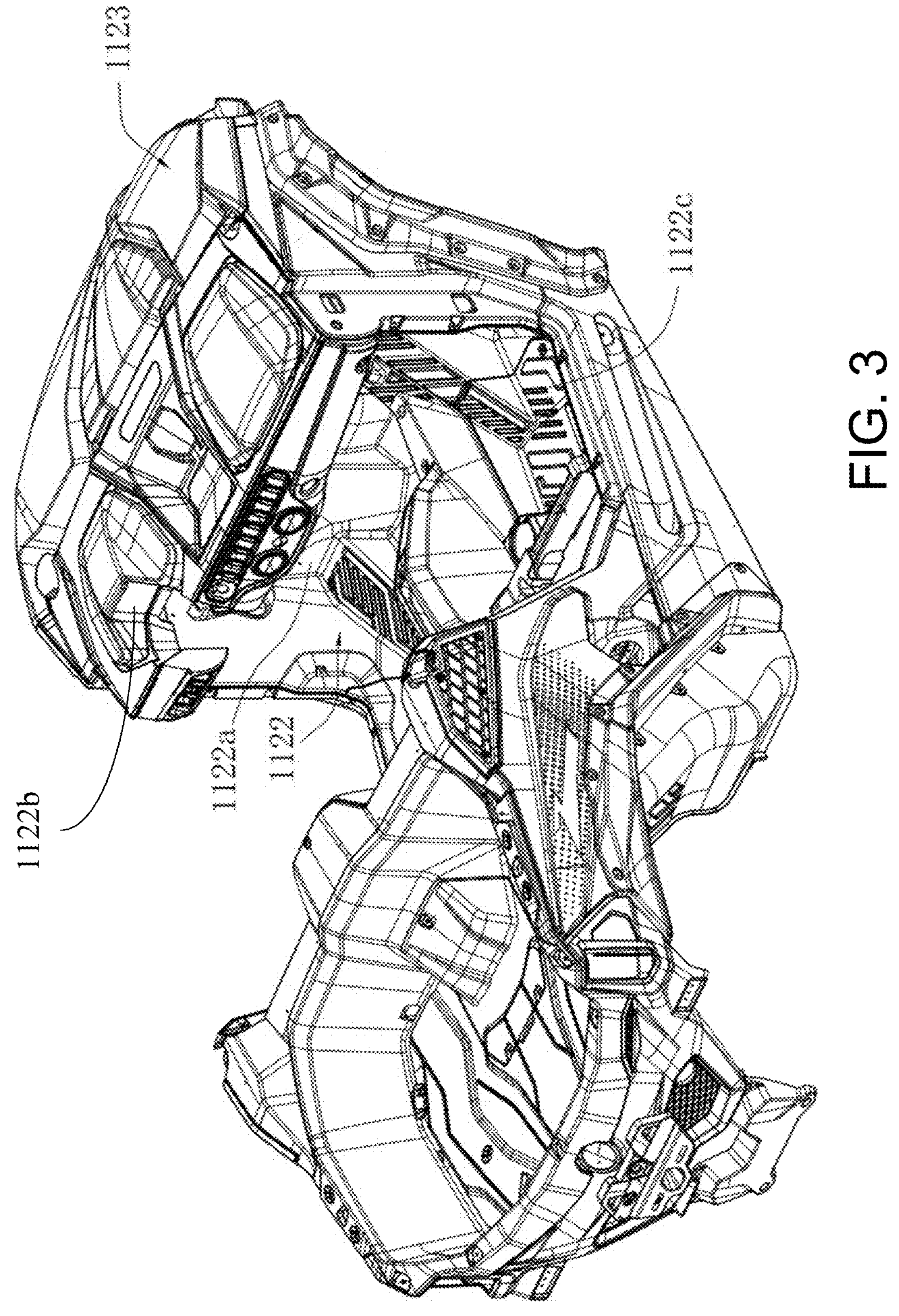
FIG. 3 is a rear perspective view of the body structure of the vehicle of FIG. 1.

Referring back to FIGS. 2 and 3, the vehicle body 112 preferably includes interior trim 1122 and exterior trim 1123. The interior trim 1122 is arranged on the frame 111, and a cabin 1121 is defined by the frame 111 and the interior trim 1122. That is to say, the interior trim 1122 is disposed around the cabin 1121. Drivers and passengers may enter and exit the cabin 1121 through an opening 1121*a* on the sides of the off-road vehicle 100. Exterior trim 1123 located at the front end, the rear end, and the side edges of the frame 111 shields and protects the front suspension assembly 15, the rear suspension assembly 16, various electrical devices, and the like.

The interior trim 1122 preferably includes a front baffle 1122*a*, an instrument panel 1122*b*, footrest 1122*c*, a rear baffle 1122*d*, and one or a plurality of seats 1122*f*. The front baffle 1122*a* is disposed close to the front end of the off-road vehicle 100 to separate the various components at the front end of the off-road vehicle 100 from the cabin 1121, and to block stones, sediment, and water. The instrument panel 1122*b* carries various instrument devices, such as a display screen, a dashboard, and the like on the vehicle. The footrest 1122*c* is mounted at the bottom of the accommodating space 111*a*, and may be used as a plate to carry various components such as seats 1122*f*, and as a position where the feet of the drivers or passengers are placed. The rear baffle 1122*d* is disposed close to the rear end of the off-road vehicle 100 and separates the various components at the rear end of the off-road vehicle 100 from the cabin 1121. The rear baffle 1122*d* and the front baffle 1122*a* are spaced apart, with the footrest 1122*c* extending between the front baffle 1122*a* and the rear baffle 1122*d*. Therefore, the cabin 1121 is defined by the front baffle 1122*a*, the footrest 1122*c* and the rear baffle 1122*d*.

Figure 11:
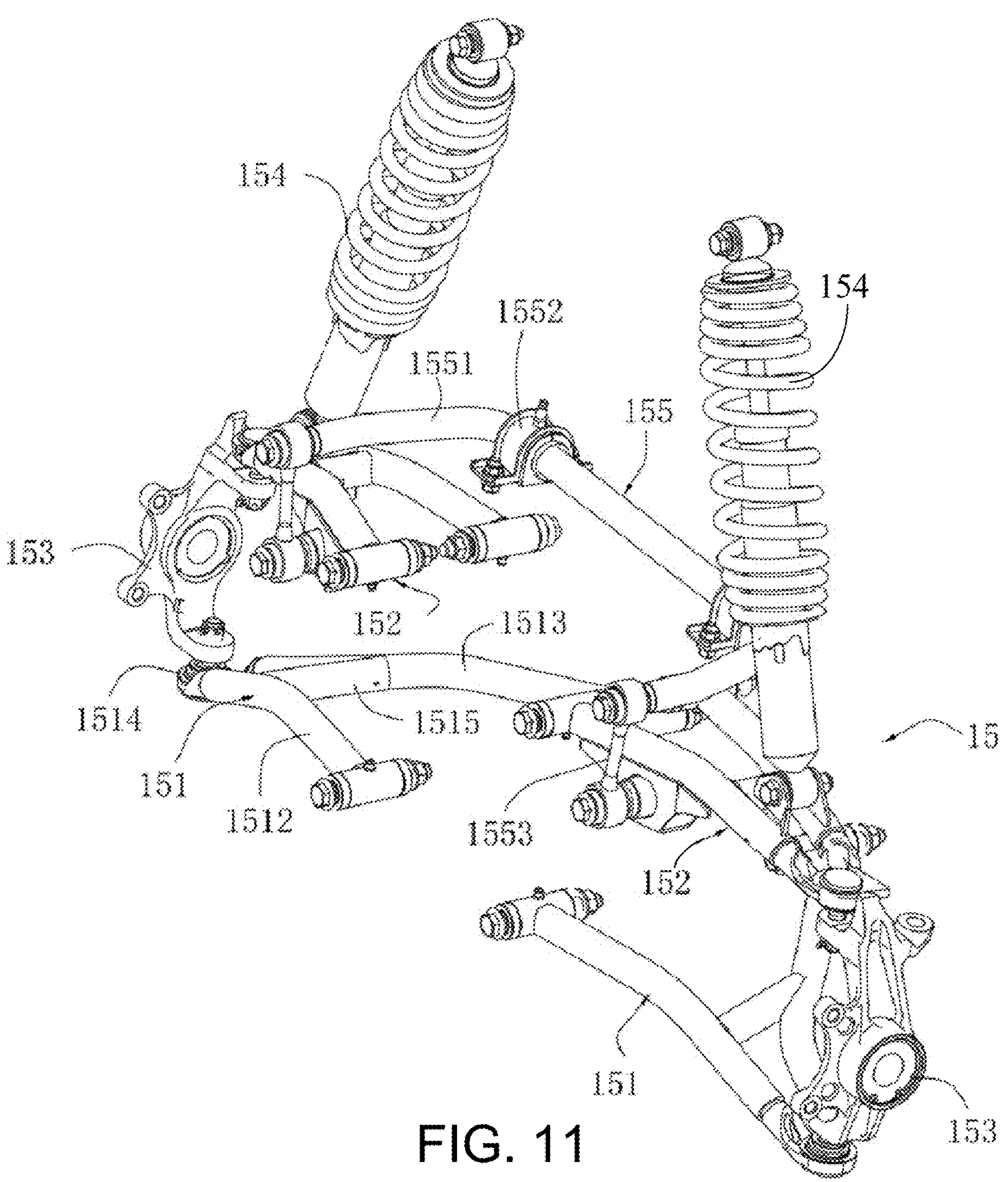
FIG. 11 is a rear perspective view of the front suspension assembly of the vehicle of FIG. 1.
Figure 12:
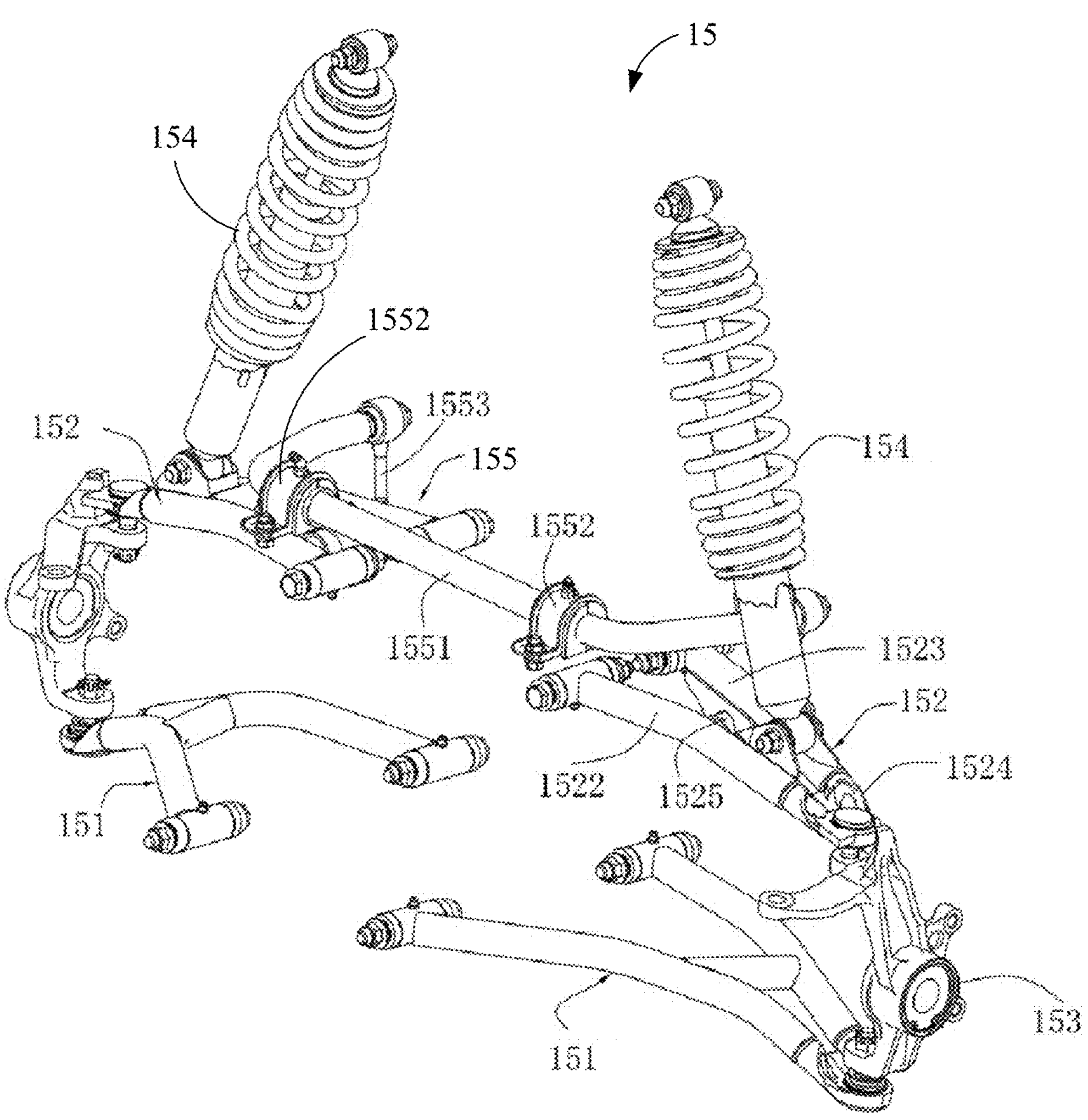
FIG. 12 is a front perspective view of the front suspension assembly of FIG. 11.

FIGS. 11 and 12 show the front suspension assembly 15, each right and left side of which preferably includes a lower rocker arm 151, an upper rocker arm 152, a front wheel shaft support assembly 153, and a front shock absorber assembly 154. Inner ends of the lower rocker arm 151 and the upper rocker arm 152 are respectively mounted on the vehicle frame 111, with the upper rocker arm 152 above the lower rocker arm 151. Each front wheel shaft support assembly 153 is used to connect one of the front wheels 17 and extends between the lower rocker arm 151 and the upper rocker arm 152. The lower rocker arm 151 and the upper rocker arm 152 are respectively rotatably connected to the front wheel shaft support assembly 153. One end of the front shock absorber 154 is preferably mounted on the first upper rocker arm 152, and the other end may be connected to the frame 111 or other components to buffer and filter the shock caused by vibration of the front wheel 17. A front torsion bar assembly 155, preferably located above the upper rocker arms 152, is rotatably connected between the upper rocker arms 152. The front torsion bar assembly 155 includes a front torsion bar 1551 which rotates within mounting seats 1552 connected to the frame 111. Ends of the front torsion bar 1551 are connected to the upper rocker arms 152 by connecting rods 1553. The connections between the connecting rods 1553 and both the torsion bar 1551 and the upper rocker arms 152 may use ball pins, or alternatively may use bearings or other connection structure. When the front wheels 17 are forced upwardly, the upper rocker arm 152 lifts up and compresses the front shock absorber 154, so that vibration may be absorbed and filtered by the front shock absorber 154. At the same time, when the first upper rocker arm 152 is forced upward, the front torsion bar 1551 is driven by the upper rocker arm 152 through the connecting rod 1553 to rotate within its mounting seat 1552. When the right front wheel 17 is forced upward more than the left front wheel 17 (or vice versa), the front torsion bar 1551 twists applying a vertical reaction force to the opposing upper rocker arm 152. The front torsion bar assembly 155 thereby helps to resist swaying of the off-road vehicle 100 during turning and helps keep the front wheels 17 in better contact with the ground. Thus, the overall handling performance is effectively improved, the stability of the vehicle body 112 is ensured and the inclination angle of the vehicle body 112 is reduced when the vehicle is cornering at high speed. Secondly, the direct connection of the front torsion bar assembly 155 with the upper rocker arm 152 delivers forces more directly for faster response.

The lower rocker arm 151 preferably includes a first rocker 1512 and a second rocker 1513 both joined to a connecting base 1514. The connecting base 1514 is mounted to the wheel shaft support 153 by one or more fasteners such as bolts and screws. The first rocker 1512 is preferably arc-shaped and arched upward, as is the second rocker 1513. The arc-shape may be capable of not only bearing a greater force, but also exerting a greater downward pressure on the wheel shaft support 153 when the wheel shaft support 153 moves upward, thereby ensuring the driving stability of the wheel 17. An angle may be defined between the second rocker 1513 and the first rocker 1512.

In the preferred embodiment, the structure, shape and the connection method of the first rocker 1512 may be the same in principle as the second rocker 1513, thereby facilitating processing and cost control. Alternatively, the structure and/or shape of the first rocker 1512 may differ from the second rocker 1513.

The lower rocker arm 151 preferably further includes a connecting rod 1515 connected between midsections of the first rocker 1512 and the second rocker 1513. The connecting rod 1515 helps the first rocker 1512 and the second rocker 1513 to function together, so as to effectively improve the structural strength and working stability of the lower rocker arm 151. The upper rocker arm 152 may similarly include two rockers 1522 and 1523, a connecting base 1524, and a connecting rod 1525, all connected and shaped similarly to corresponding parts of the lower rocker arm 151.

The number of front shock absorbers 154 could alternatively be increased/decreased according to the requirements of front shock absorption. Moreover, structure and operating principles of shock absorbers 154 are well-known, and will not be described in detail.

Figure 5:
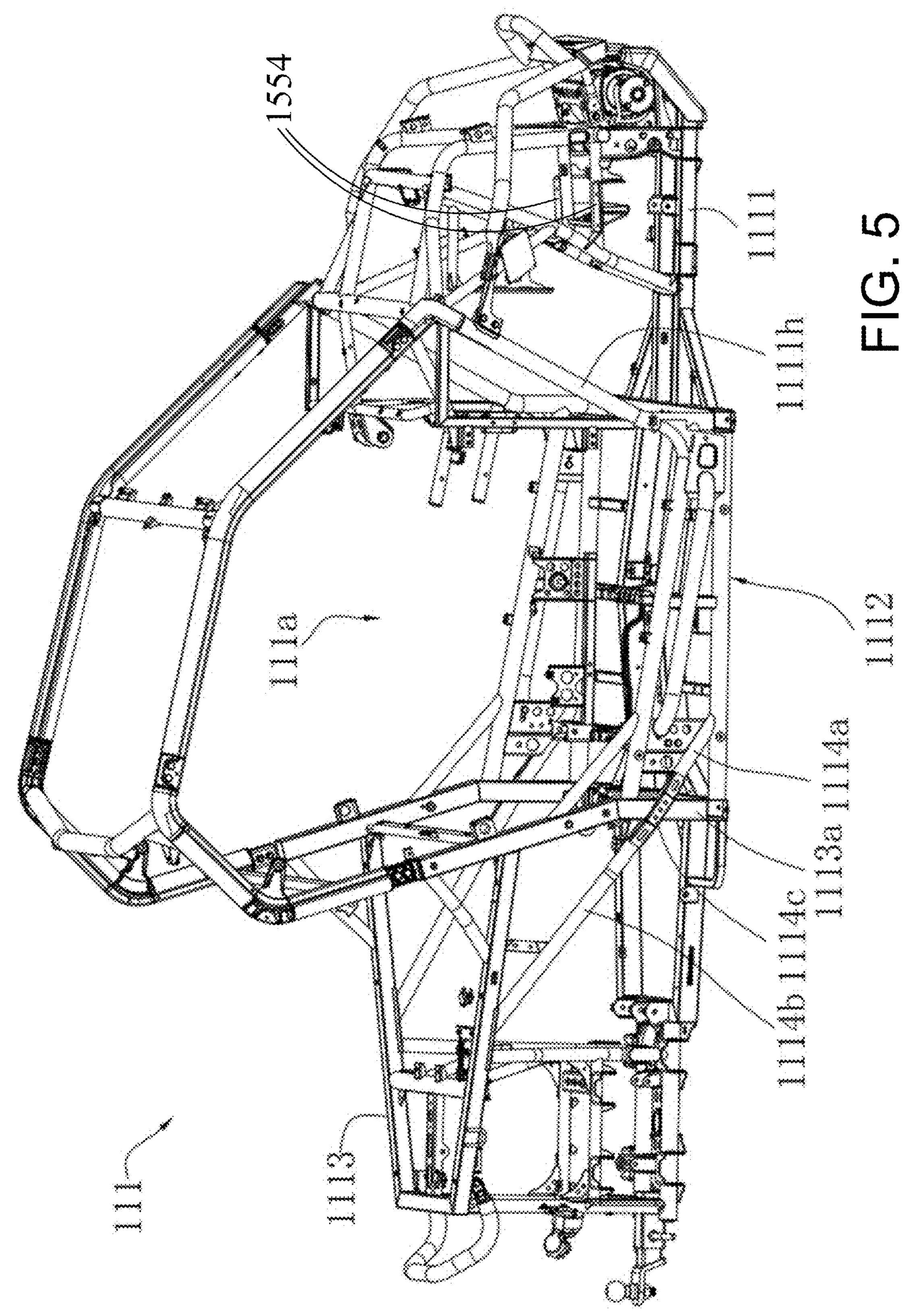
FIG. 5 is an opposing side, more from above, perspective view of the frame of FIG. 4.
Figure 9:
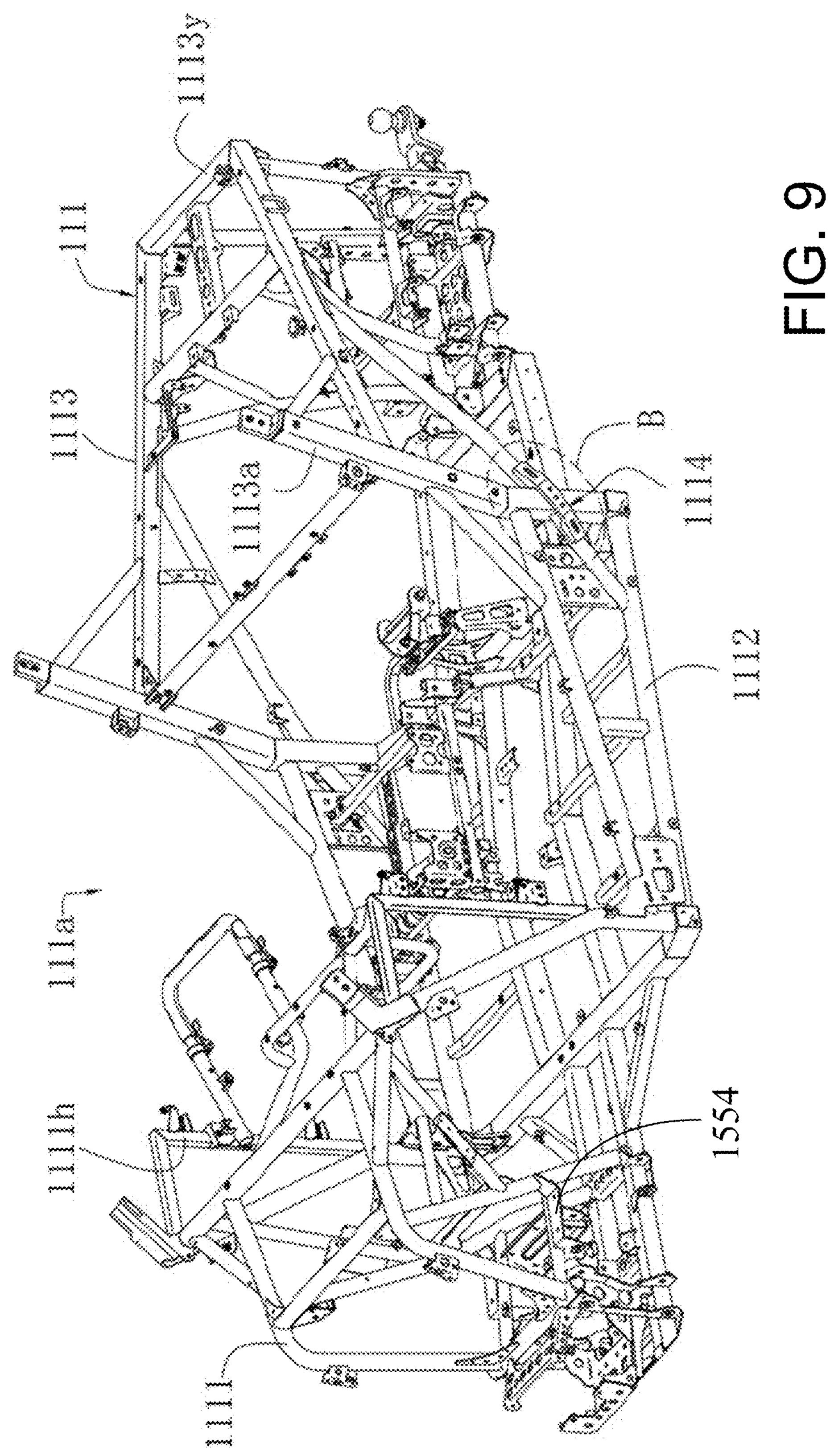
FIG. 9 is a perspective view of a selected portion of the frame of FIGS. 4-6 from another point of view.
Figure 10:
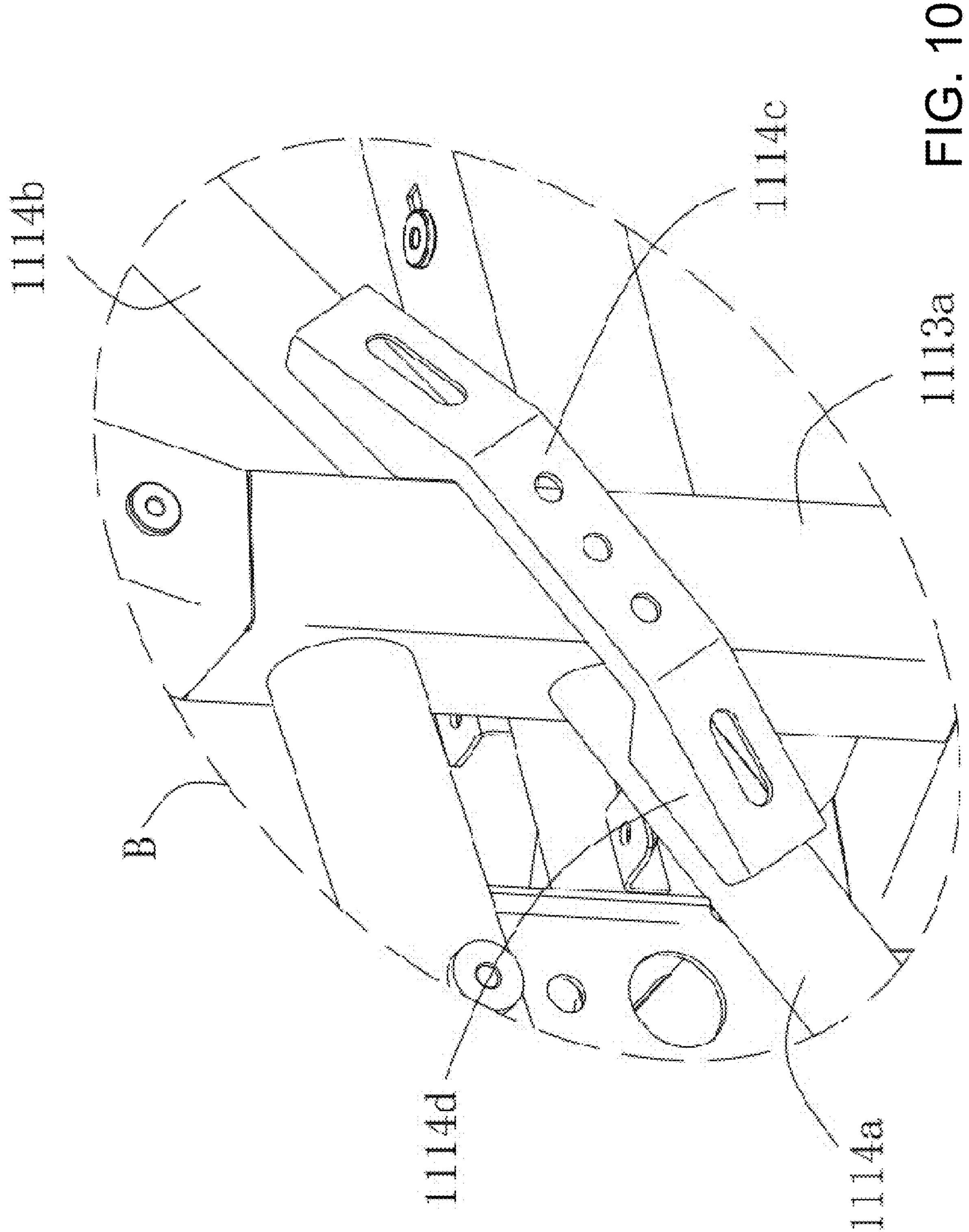
FIG. 10 is an enlarged view of part B in FIG. 9.
Figure 13:
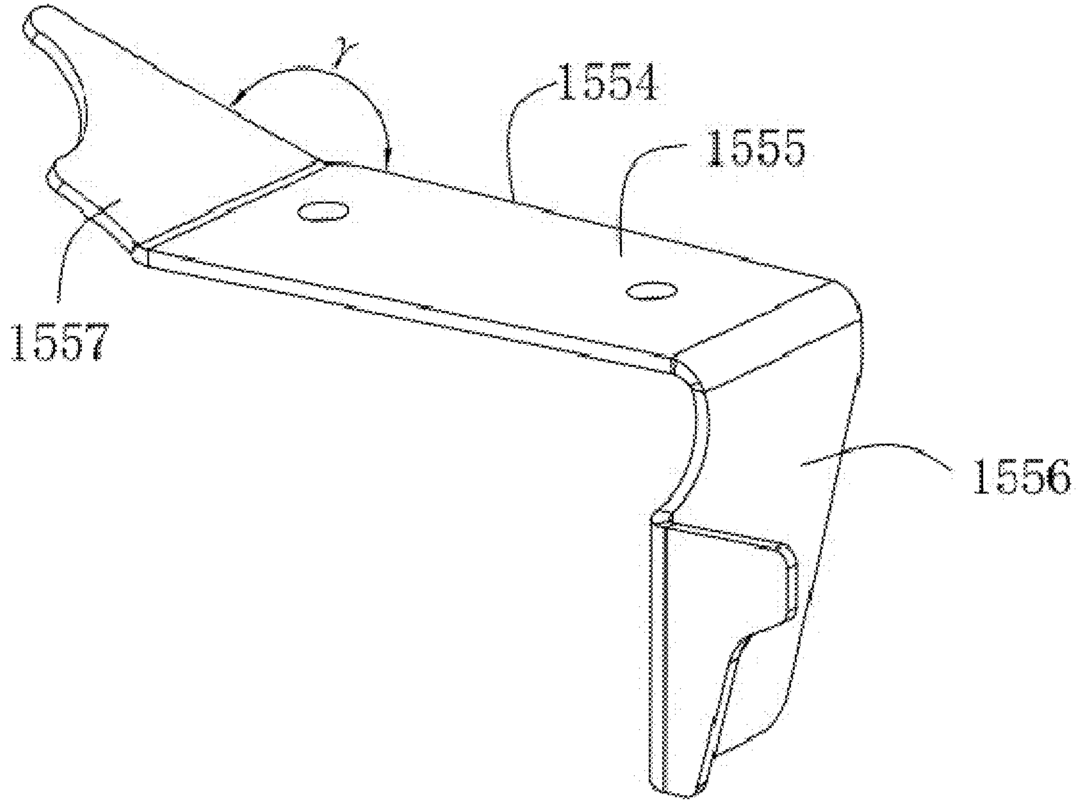
FIG. 13 is a perspective view of the preferred front supporting plate.

The mounting seats 1552 may be mounted on the front frame portion 1111 using two mounting seat supports 1554 called out in FIGS. 5 and 9, a preferred one of which is shown in FIG. 13. The supports 1554 are fixed to the front frame portion 1111 such as by welding. Each mounting seat support 1554 preferably includes a supporting plate 1555, and a first extending wall 1556 and a second extending wall 1557 located at ends of the supporting plate 1555. Each mounting seat 1552 is fixed on its mounting seat supporting plate 1555 by bolts or the like extending through holes in the mounting seats 1552 and through corresponding holes in the supporting plate 1555. One end of the first extending wall 1556 away from the supporting plate 1555 is abutted against the upper rocker arm 152, and the other end is connected such as by welding to the front frame portion 1111, and the end of the second extending wall 1557 is connected to the front frame portion 1111 such as by welding. The delivery path of the load of the front torsion bar 1551 uses the first extending wall 1556 and the second extending wall 1557, which walls 1556, 1557 increase the surface area of load transfer and reduce the likelihood of breakage of the connection. The angle between the second extending wall 1557 and the front supporting plate 1555 is defined as $\gamma$, and $\gamma$ is preferably in the range from 30° to 50°. Within this range, the stress value between the second extending wall 1557 and the front support 1554 is smaller, which is favorable for the connection between the second extending wall 1557 and the frame 111.

Figure 14:
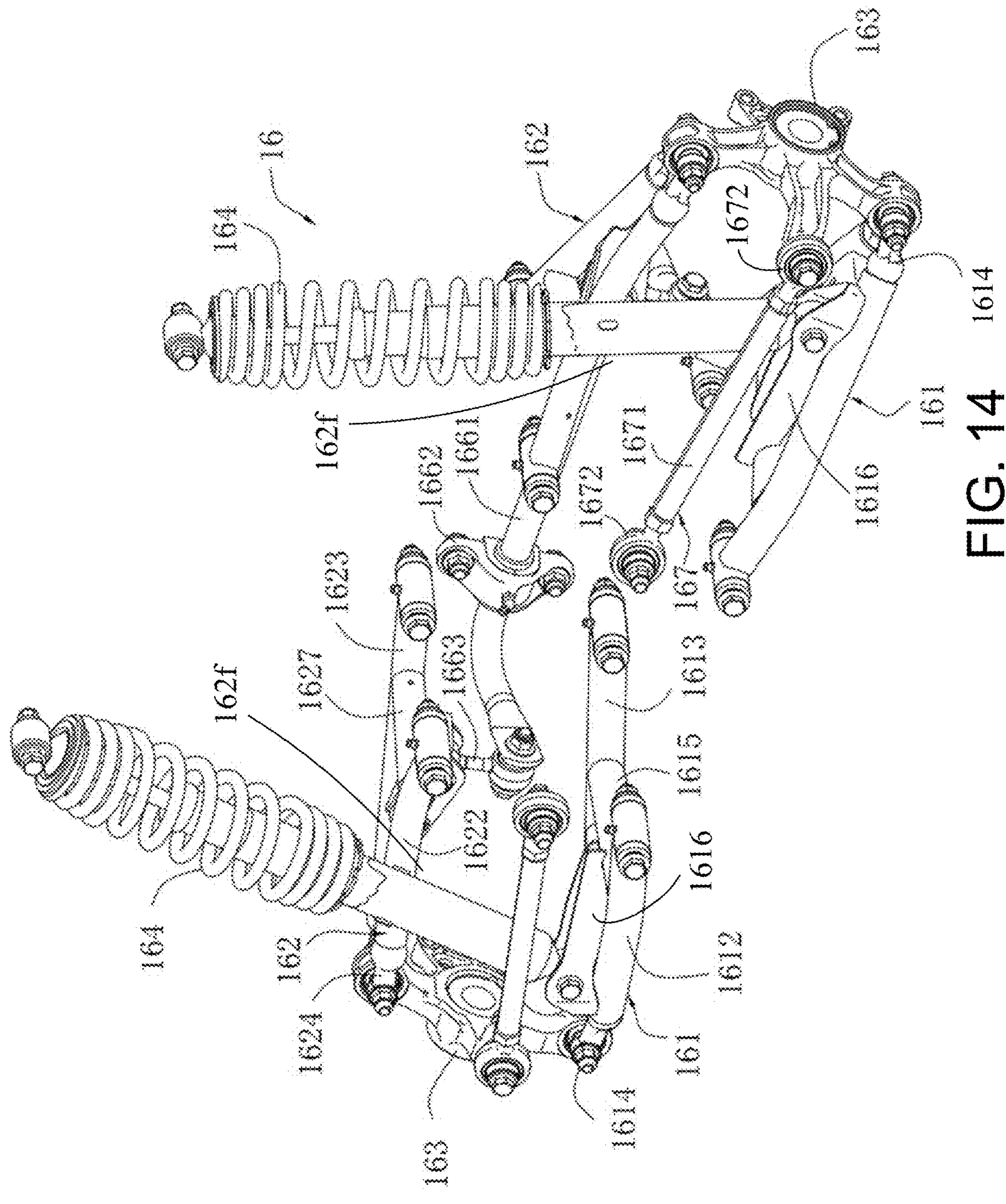
FIG. 14 is a front perspective view of the rear suspension assembly of the vehicle of FIG. 1.
Figure 15:
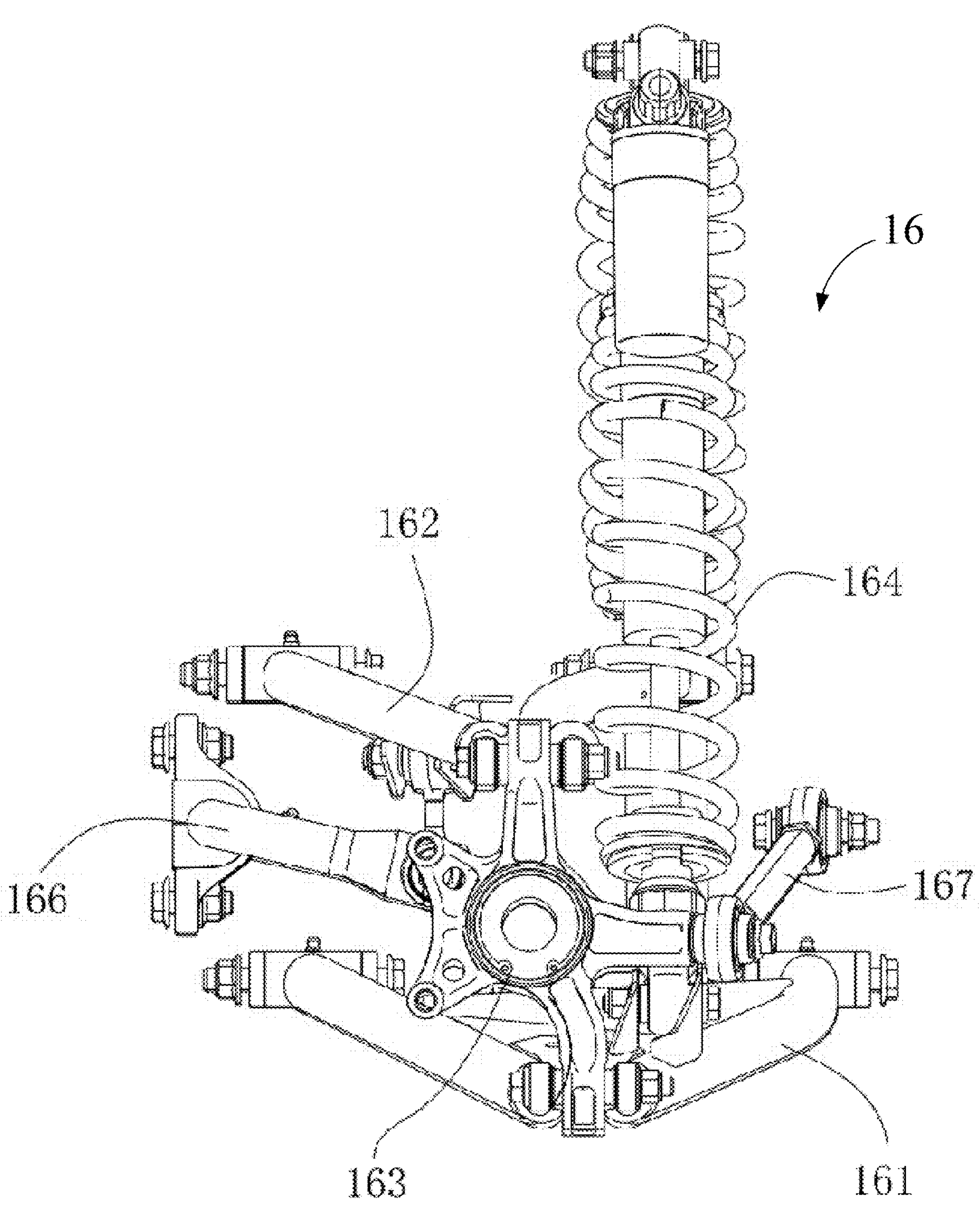
FIG. 15 is a side view of the rear suspension assembly of FIG. 14.
Figure 17:
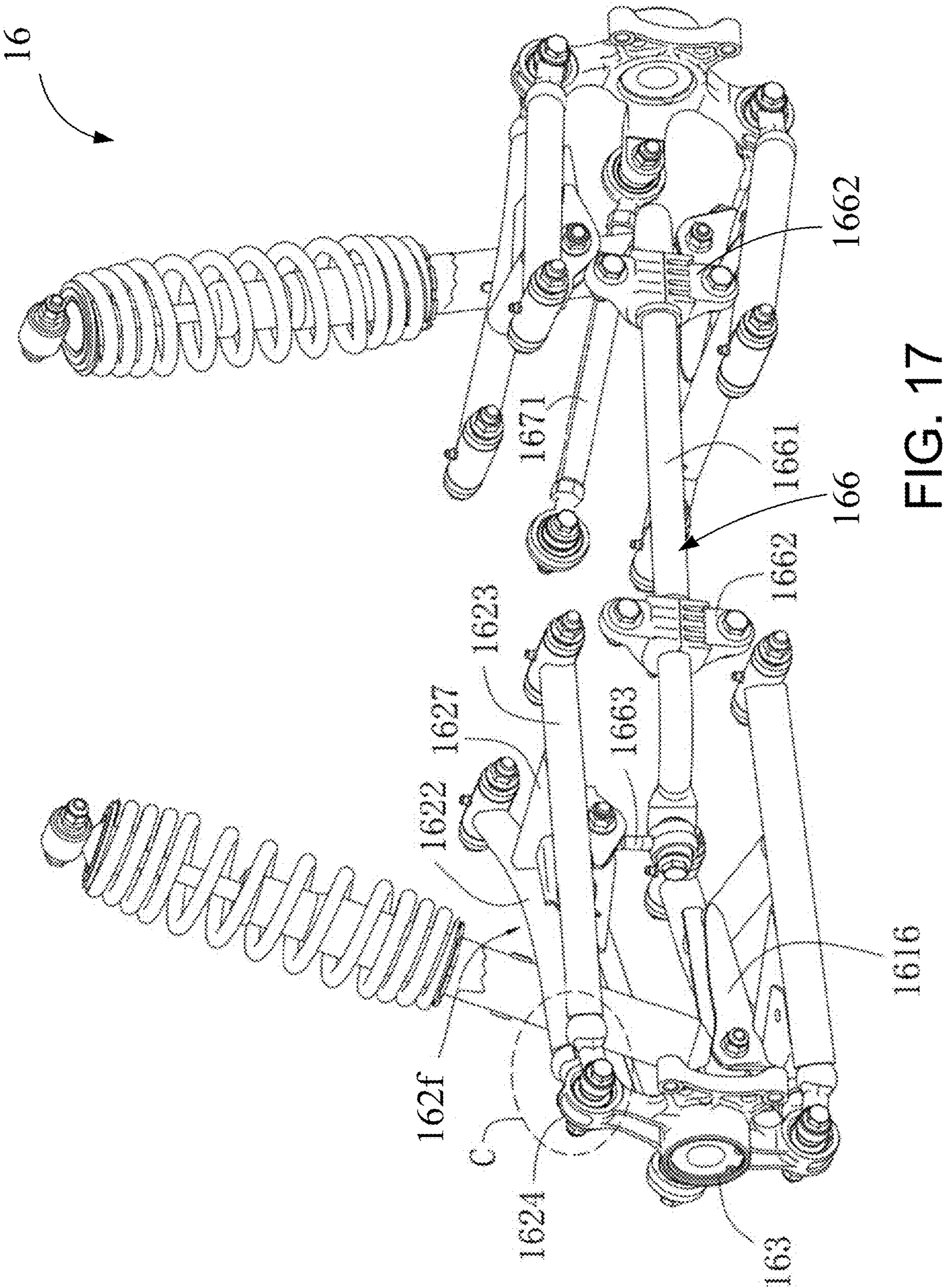
FIG. 17 is a rear perspective view of the rear suspension assembly of FIGS. 14 and 15.

FIGS. 14, 15 and 17 show the rear suspension assembly 16, which is mounted on the rear frame portion 1113 and connected to the rear wheels 18 to buffer and filter vibrations caused by the rear wheels 18. The rear suspension assembly 16 preferably includes right and left lower rocker arms 161, right and left upper rocker arms 162, right and left rear wheel shaft support assemblies 163, right and left rear shock absorber assemblies 164 and a rear torsion bar assembly 166, each of which are arranged and operate similarly to their counterparts in the front suspension assembly 15. However, the rear shock absorber assemblies 164 are preferably mounted on the lower rocker arms 161, and the rear suspension assembly 16 preferably also includes right and left control arm assemblies 167.

Figure 16:
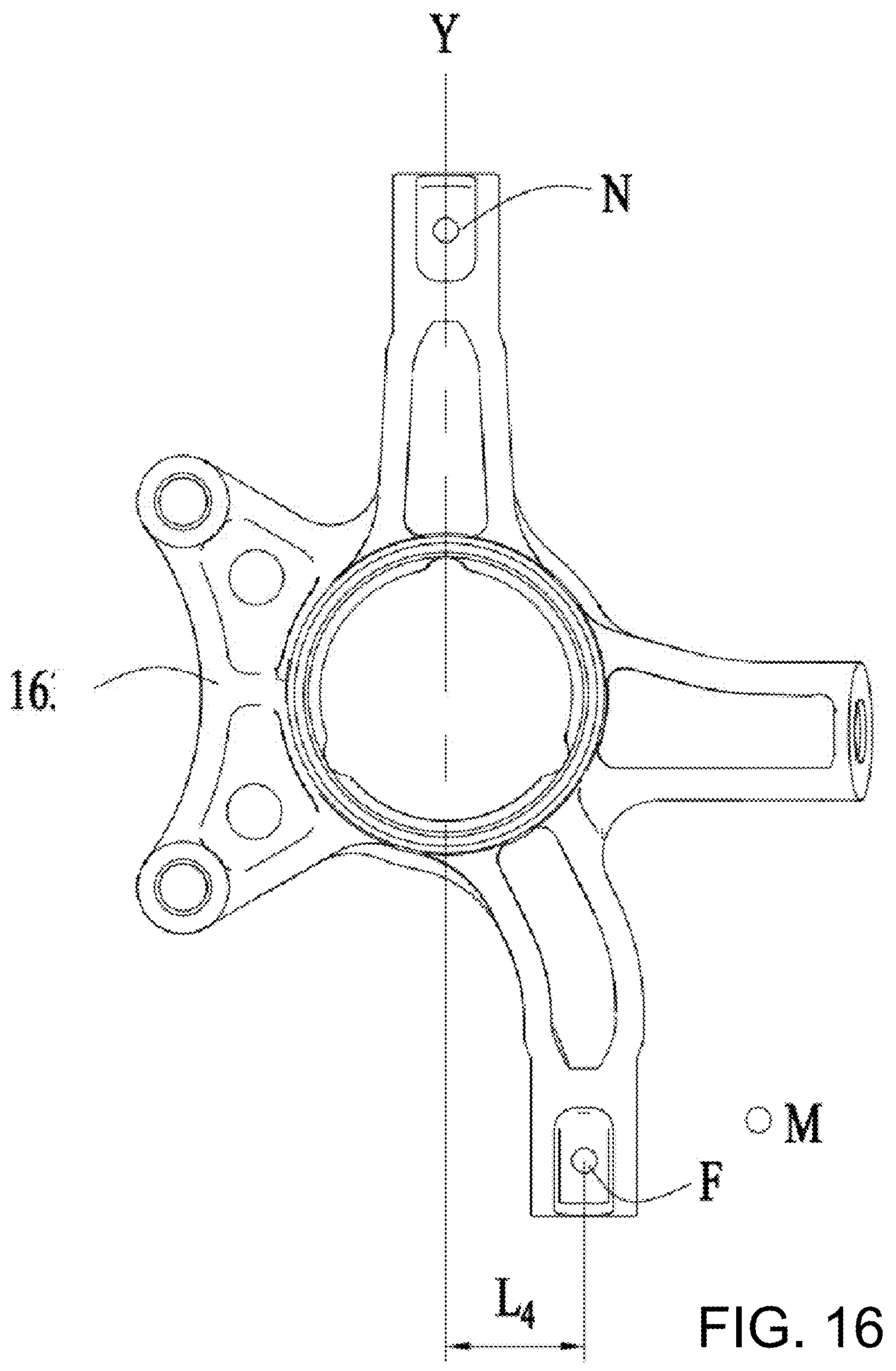
FIG. 16 is a side view of structure of the preferred left-rear wheel shaft support.

The effect of mounting the rear shock absorber 164 on the lower rocker arm 161 is further explained with reference to FIG. 16, which details various connection points in side view relative to the rear wheel shaft support 163. The connection between the outer end of the lower rocker arm 161 and the rear wheel shaft support 163 is defined as a first connection point F. The connection between the outer end of the upper rocker arm 162 and the rear wheel shaft support 163 is defined as a second connection point N. A straight line Y is defined by connecting the point N and the center point of the rear wheel shaft support 163. The connection between the rear shock absorber 164 and the lower rocker arm 161 (the point where force of the shock absorber 164 is applied) is defined as a third connection point M. The first connection point F and the second connection point N preferably do not coincide along the vertical direction, with the first connection point F instead being behind (and much lower) than the second connection point N. The third connection point M is behind (and at nearly the same elevation as) the first connection point F. In other words, in the front-rear direction of the off-road vehicle 100, the first connection point F is closer to the third connection point M than the front-rear distance between the second connection point N and the third connection point M. The distance L4 from the first connection point F to the straight line Y may be in the range from 20 mm to 40 mm. The point of force of the rear shock absorber 164 is closer in elevation to the rear wheel shaft support 163, and the moment arm of force between the point of force M and the first connection point F is reduced. The force when the rear wheel 18 hits a bump or obstacle is delivered to the rear wheel shaft support 163, and the opposing force applied by the shock absorber 164 to the lower rocker arm 161 is more easily delivered and shared by the rear wheel shaft support 163. Therefore, the lower rocker arm 161 can more easily meet the use requirements and the cost can be reduced.

Further referring to FIG. 14 and similar to the front lower rocker arms 151, the rear lower rocker arms 161 include two rockers 1612, 1613, a connecting base 1614 and at least one connecting rod 1615.

As called out in FIGS. 14 and 17, each lower rocker arm 161 preferably further includes a shock absorber attachment plate 1616. The shock absorber attachment plate 1616 is preferably attached to and extends between the rear rocker 1612 and the connecting rod 1615. This preferred location for the shock absorber attachment plate 1616 allows both the connecting rod 1615 and the rear rocker 1612 to share the force together when the suspension is forced, so as to avoid the deformation of the connecting rod 1615 or rocker 1612 due to force of the shock absorber 164. A lower end of the rear shock absorber 164 is hinged on the shock absorber attachment plate 1616, and the other end extends upward for connection to the rear frame portion 1113. The shock absorber attachment plate 1616 may alternatively or additionally be connected to the front rocker 1613, or to only the rear rocker 1612 or only the third connecting rod 1615. The example above is only illustrative of several installation methods of the shock absorber attachment plate 1616, and several modifications and improvements can be made without departing from the concept of the present application, which all belong to the scope of the present invention.

As called out in FIG. 14 and FIG. 17 and similar to the front upper rocker arm 152, the rear upper rocker arm 162 includes two rockers 1622, 1623, a connecting base 1624, and a connecting rod 1627. The rear rocker 1622 is preferably bent towards the front rocker 1623 of the rear upper rocker arm 162 so as to form an avoidance space **162*f*. The rear shock absorber 164 extends through the avoidance space 162*f***.

Figure 18:
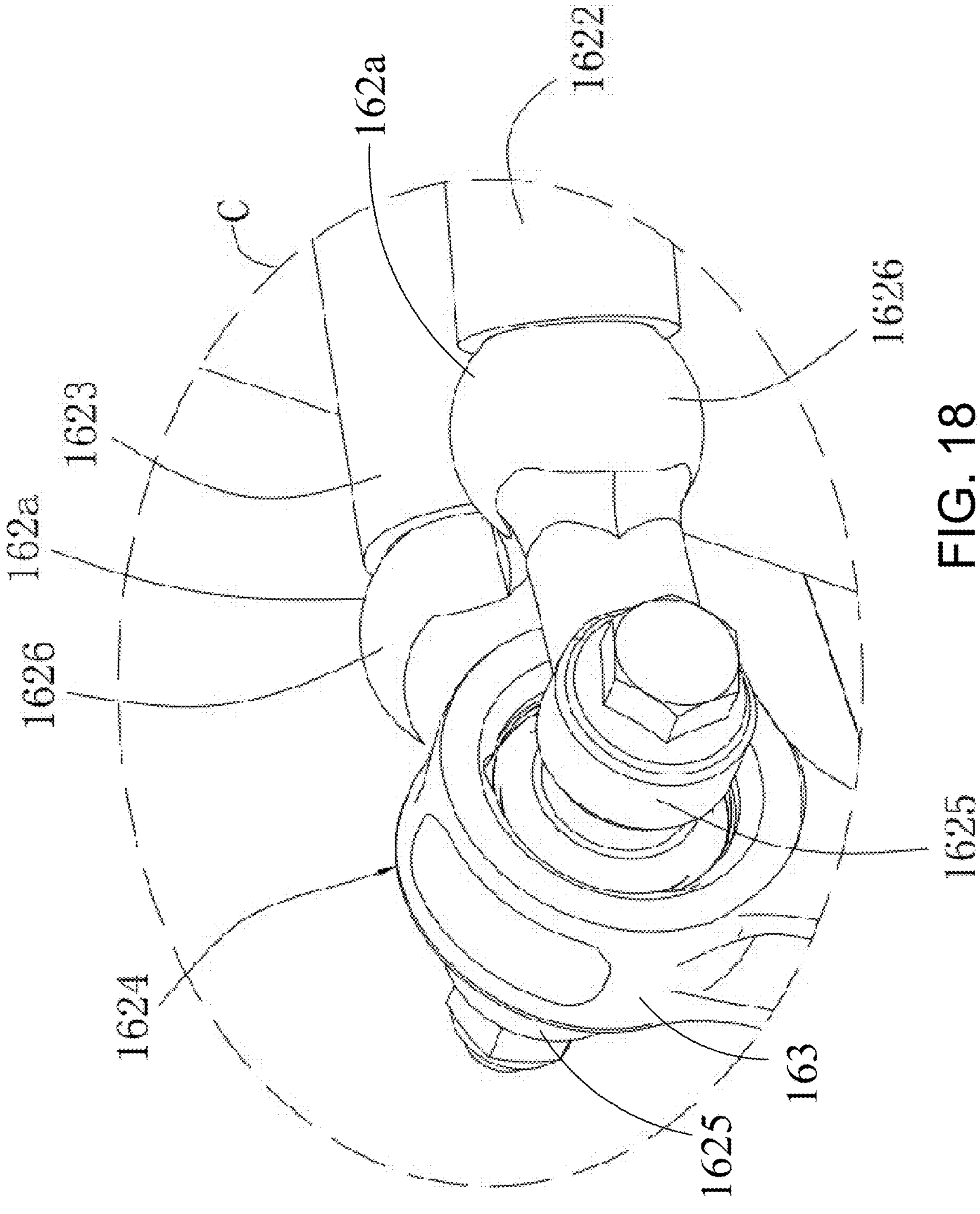
FIG. 18 is an enlarged view of part C in FIG. 17.
Figure 19:
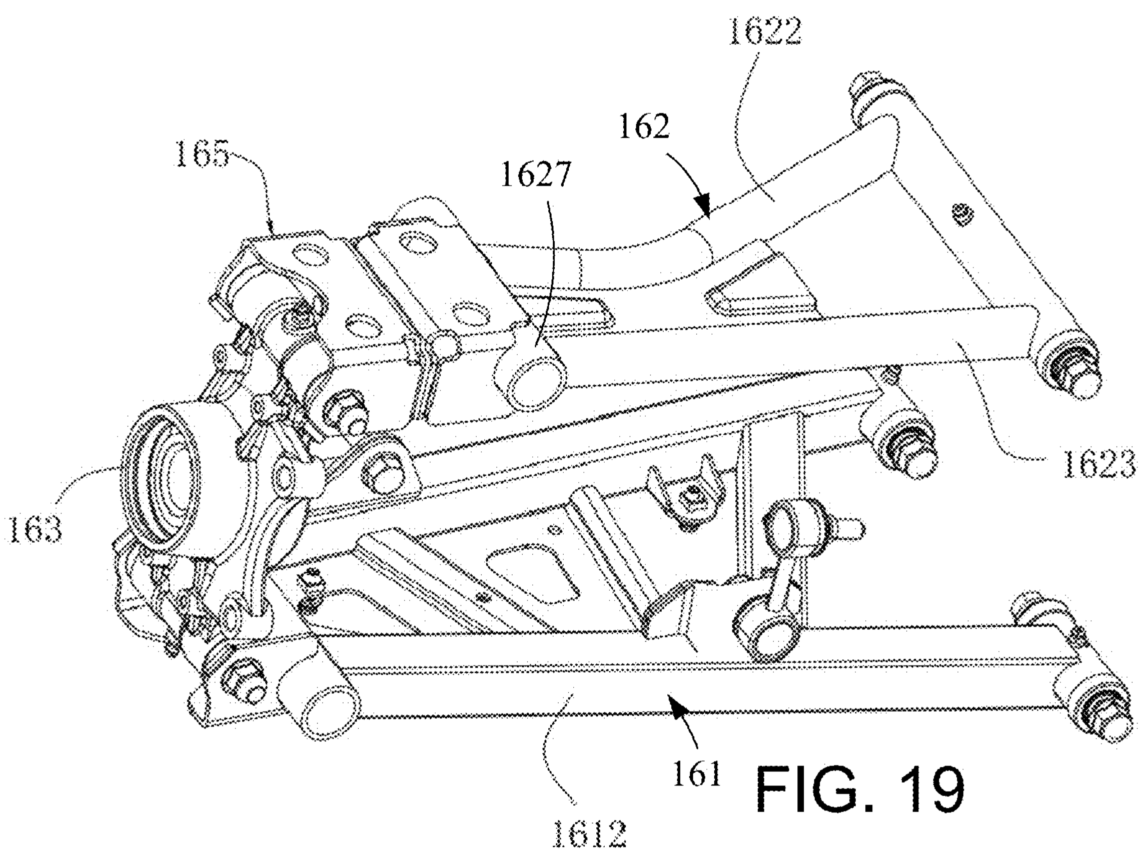
FIG. 19 is a rear perspective view of a left portion of the rear suspension assembly in another embodiment.

As best shown in FIG. 18, the preferred connecting base 1624 of each of the rear upper rocker arms 162 includes two support arm parts 1625 each having a connecting part 1626 with a curved surface **162*a*. The two connecting parts 1626 may be connected to each other or may remain unconnected. One end of each support arm part 1625 is rotatably connected to the rear wheel shaft support 163. The ends of the rockers 1622, 1623 are respectively welded or otherwise attached to the curved surface 162*a*. Each rocker welding position may be welded within the range of the curved surface 162*a* at any angle according to requirements. That is to say, the connecting base 1624 can be adapted to the different rockers within requirements by providing a curved surface 162*a* of the connecting portions 1626, thereby improving the versatility of the product and effectively reducing the cost. In the most preferred embodiment shown, the curved surface 162*a*** is spherical.

FIGS. 19-22 show another embodiment of a rear suspension assembly 16. This embodiment further includes an adjustment assembly 165 provided between the rear wheel shaft support assembly 163 and the rear upper rocker arm 162 and/or the rear lower rocker arm 161. The adjustment assembly 165 allows adjustment of the camber angle of the rear wheel shaft support assembly 163, which enables the off-road vehicle 100 meet the current use requirements. Similar adjustment assemblies may also be applied to the front suspension assembly 15 to adjust the camber angles of the front wheels 17.

Figure 20:
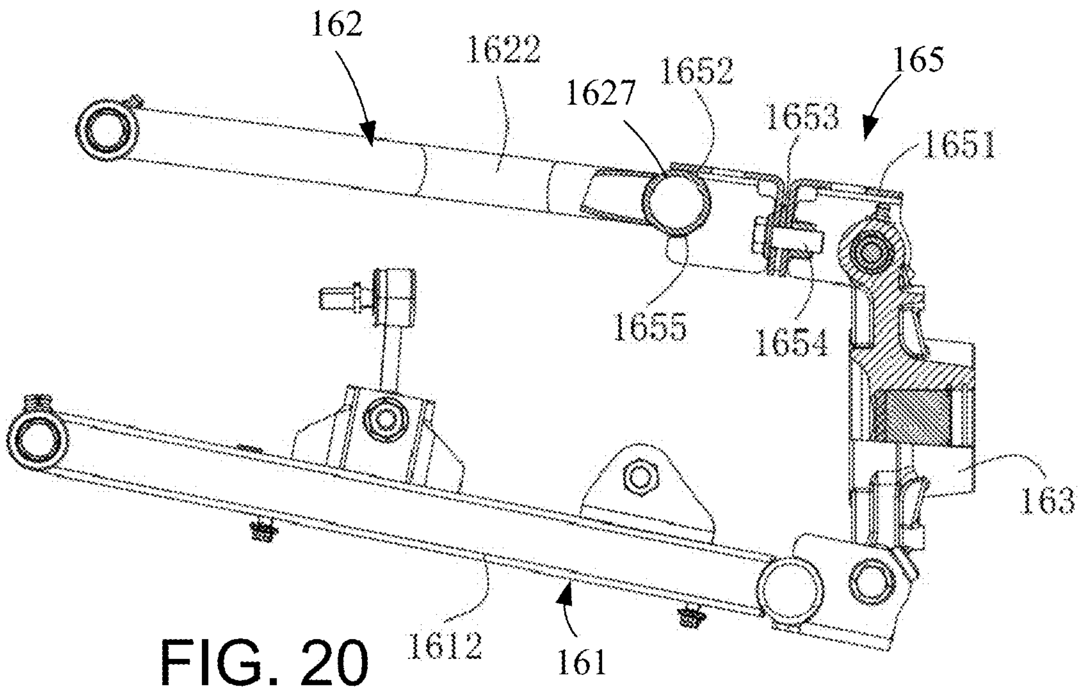
FIG. 20 is a cross-sectional view of the rear suspension assembly of FIG. 19.

As best shown in FIG. 20, each adjustment assembly 165 includes a first seat body 1651, a second seat body 1652, an adjustment piece 1653, and a fastener 1654. The first seat body 1651 is rotatably connected to the wheel shaft support 163. The second seat body 1652 is preferably connected to the upper rocker arm 162. The adjustment piece 1653 is positioned between the first seat body 1651 and the second seat body 1652, and is used to adjust the gap between the first seat body 1651 and the second seat body 1652, thereby adjusting the overall length of the upper rocker arm 162 and changing the corresponding camber angle. The fastener 1654 is used to lock the adjusted first seat body 1651 and the adjusted second seat body 1652; or to unlock the first seat body 1651 and the second seat body 1652.

In one embodiment, the first seat body 1651 and the second seat body 1652 are both hollow. One end of the fastener 1654 passes from the interior of the second seat body 1652 to the interior of the first seat body 1651. The adjustment piece 1653 may be C-shaped or U-shaped, so that the C-shaped or U-shaped adjustment piece 1653 may be able to be directly clamped on the fastener 1654. Therefore, the gap between the first seat body 1651 and the second seat body 1652 can be adjusted without removing the fastener 1654, which is more convenient. The adjustable range of the gap between the first seat body 1651 and the second seat body 1652 may be less than or equal to 5 cm. The fastener 1654 may be a bolt. The bolt may pass through the first seat body 1651 to the second seat body 1652 and may be connected to a nut, and the adjustment piece may be sleeved on the bolt.

An arc-shaped slot 1655 is preferably provided on the second seat body 1652. The connecting rod 1627 is preferably embedded in the arc-shaped slot 1655 and welded to the second seat body 1652, thereby increasing contact area and improving the connection strength between the rocker arm 162 and the second seat body 1652.

As shown in FIGS. 14, 15 and 17, the preferred rear torsion bar assembly 166 includes a rear torsion bar 1661, two rear mounting seats 1662, and two rear connecting rods 1663. The rear torsion bar assembly 166 is mounted and operates similarly to the front torsion bar assembly 155, except that the rear torsion bar 1661 is preferably below the rear upper rocker arms 162, such that connecting rods 1663 extend from the ends of the rear torsion bar 1661 upwardly. The rear mounting seats 1662 may be fixed to the rear frame portion 1113 or to components, such as the vehicle body 112. In one embodiment, the connecting rods 1663 are connected to the upper rocker arms 162 by ball pins, though other connections such as bearings may alternatively be used. The rear torsion bar assembly 166 may be located toward the front of the rear frame portion 1113, so as to make the entire rear suspension assembly 16 more compact, to reduce the protrusion of the rear torsion bar 1661, and to improve the integrity and aesthetics when viewed from the rear end of the off-road vehicle 100. Additionally, this location of the rear torsion bar 1661 reduces interference of the rear torsion bar 1661 and its movement with the installation of other components. In addition, this location of the rear torsion bar 1661 also protects the rear torsion bar 1661 by the rear frame portion 1113.

The control arm assemblies 167 are preferably located toward the rear of the rear frame portion 1113, opposite to the position of the rear torsion bar assembly 166. The control arm assemblies 167 are preferably located at an elevation between the second lower rocker arm 161 and the second upper rocker arm 162. Each control arm assembly 167 includes a control arm 1671, one end of which is rotatably connected to the rear wheel shaft support assembly 163, and the other end of which is rotatably connected to the frame 111. During rear suspension travel, the rear wheel shaft support assembly 163 is driven to swing along the movement track of the rigid control arm 1671, so as to change the camber and toe-in angle of the attached rear wheel 18, thereby improving stability of the vehicle.

Each preferred control arm assembly 167 includes the control arm 1671 and two rotating bases 1672 which are fixed to the rear frame portion 1113 and the rear wheel shaft support assembly 163, respectively. The control arm 1671 is rotatably connected to the rotating bases 1672. The control arm 1671 and the rotating bases 1672 are preferably rotatably connected by ball pins to realize relative rotation and swing between the control arm 1671 and the rear frame portion 1113. Other connection methods, such as joint bearing connection, may alternatively be used.

Figure 21:
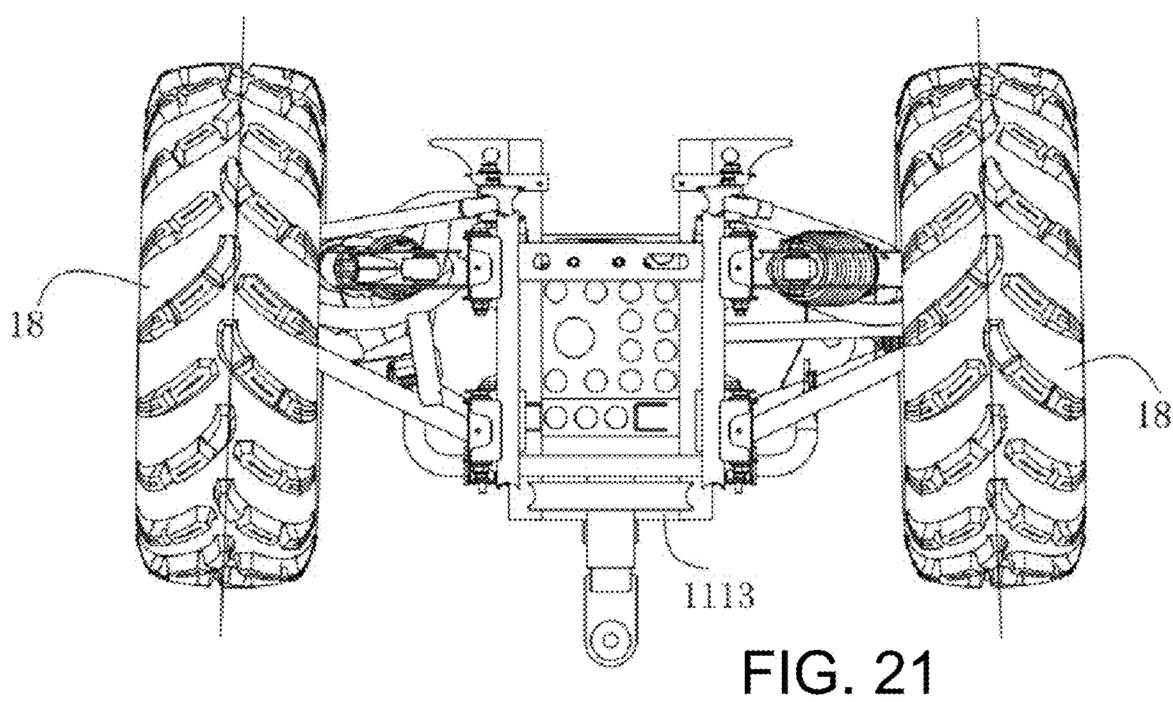
FIG. 21 is a perspective view of the state of the rear wheels when the control arm is at the lowest position of rear suspension travel.
Figure 22:
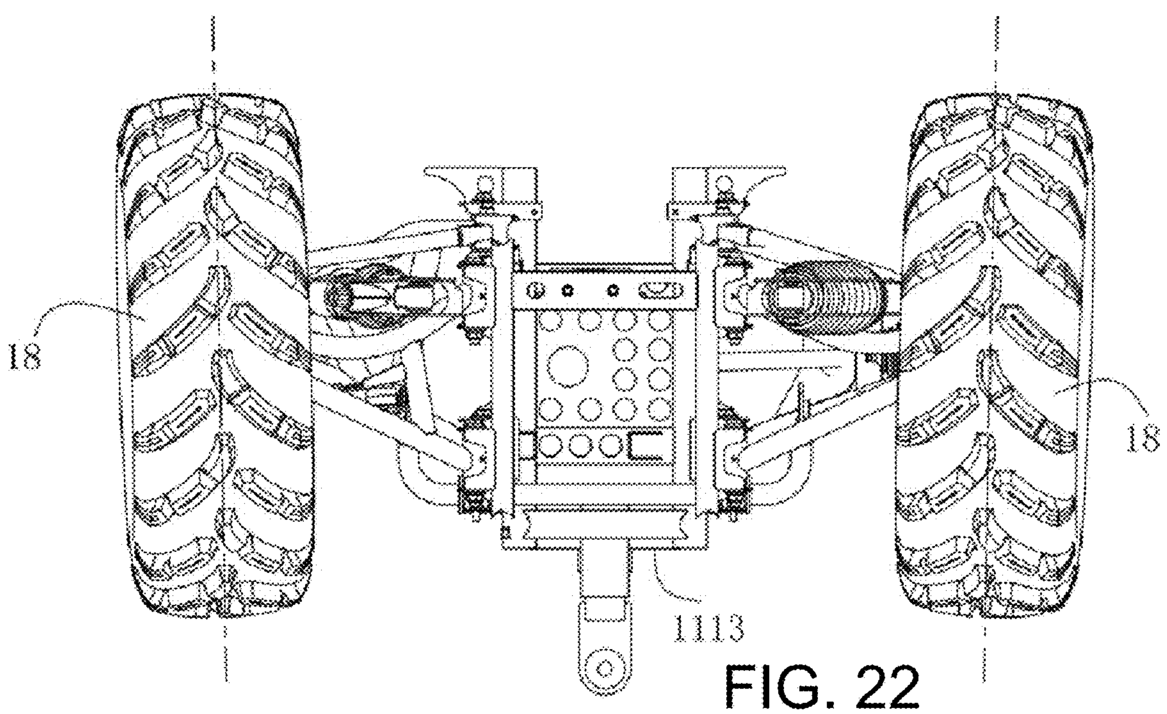
FIG. 22 is a perspective view of the state of the rear wheels when the control arm is at the highest position of rear suspension travel.

FIG. 21 shows the state of the rear wheels 18 when the control arm 1671 is at its lowest position during suspension travel. FIG. 22 shows the state of the rear wheels 18 when the control arm 1671 is at its highest position. The control arm assemblies 167 maintain the toe-in value of the rear wheels 18 within a range conducive to the driving of the off-road vehicle 100, thereby assisting the steering and handling the off-road vehicle 100.

The technical features of the above embodiments can be combined selectively. In order to simplify the description, all possible combinations of the technical features in the above embodiments have not been expressly mentioned. However, as long as there is no contradiction between the combinations of these technical features, they should be considered to be within the scope of the description.

Figure 23:
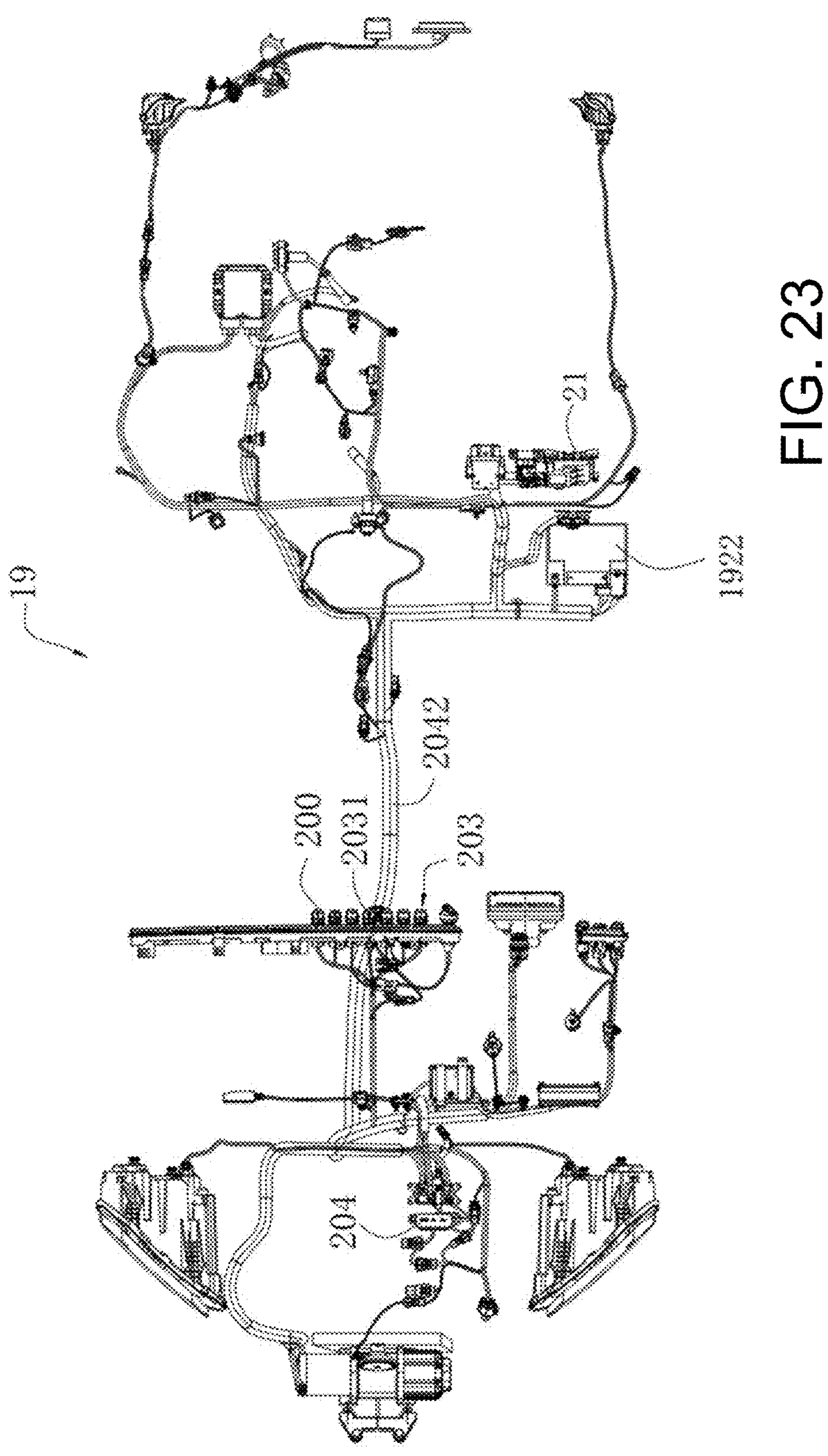
FIG. 23 is a schematic view showing the distribution of electrical components on the off-road vehicle of FIG. 1.

FIG. 23 shows a preferred electrical schematic layout of the off-road vehicle 100, including a plurality of electrical components 19 and an electronic controller 21. The various electrical components 19 and the electronic controller 21 may be directly or indirectly mounted on the frame assembly 11, and the electrical components 19 are at least partially connected (electrically/signally) to the electronic controller 21 to enable control over the basic electrical functions of the off-road vehicle 100. The electronic controller (referred to as ECU hereinafter) 21 is also referred to as "travelling computer", and is used to monitor various input data (such as braking data, gear shifting data, etc.) and various states of vehicle operation (such as acceleration, skidding, fuel consumption, etc.); calculate the information transmitted by various sensors according to a pre-designed program; send various parameters (after processing) to various relevant actuators, such as electrical components 19; and perform various predetermined control functions.

In one embodiment, the electrical components 19 include instrumentation 200 and a plurality of switches 203. The instrumentation 200 may include various electrical instruments, such as an ammeter, a charging indicator or a voltmeter, an oil pressure gauge, a thermometer, a fuel gauge, a vehicle speed and odometer, an engine tachometer, and the like. The instrumentation 200 is mainly used to display the status of relevant devices during the driving of the off-road vehicle 100. A warning indicator may be mainly used to generate sound to prompt or provide warning. The plurality of switches 203 may include a mode switch 2031, an air conditioning switch (not called out), a temperature adjustment switch (not called out), and the like. The mode switch 2031, the air conditioning switch, and the temperature adjustment switch may be generally mounted on an instrument panel 1122*b* (shown in FIG. 3) for the convenience of the driver and front passenger. The mode switch 2031, the air conditioner switch, the temperature adjustment switch, and the like are electrically/signally connected to the electronic controller 21 by wiring harnesses 2042, so as to control a series of functions of the off-road vehicle 100, such as the switching of the two-wheeled drive and the four-wheeled drive, the turning on of the air conditioner, and the adjustment of the air conditioner temperature, and the like.

Figure 24:
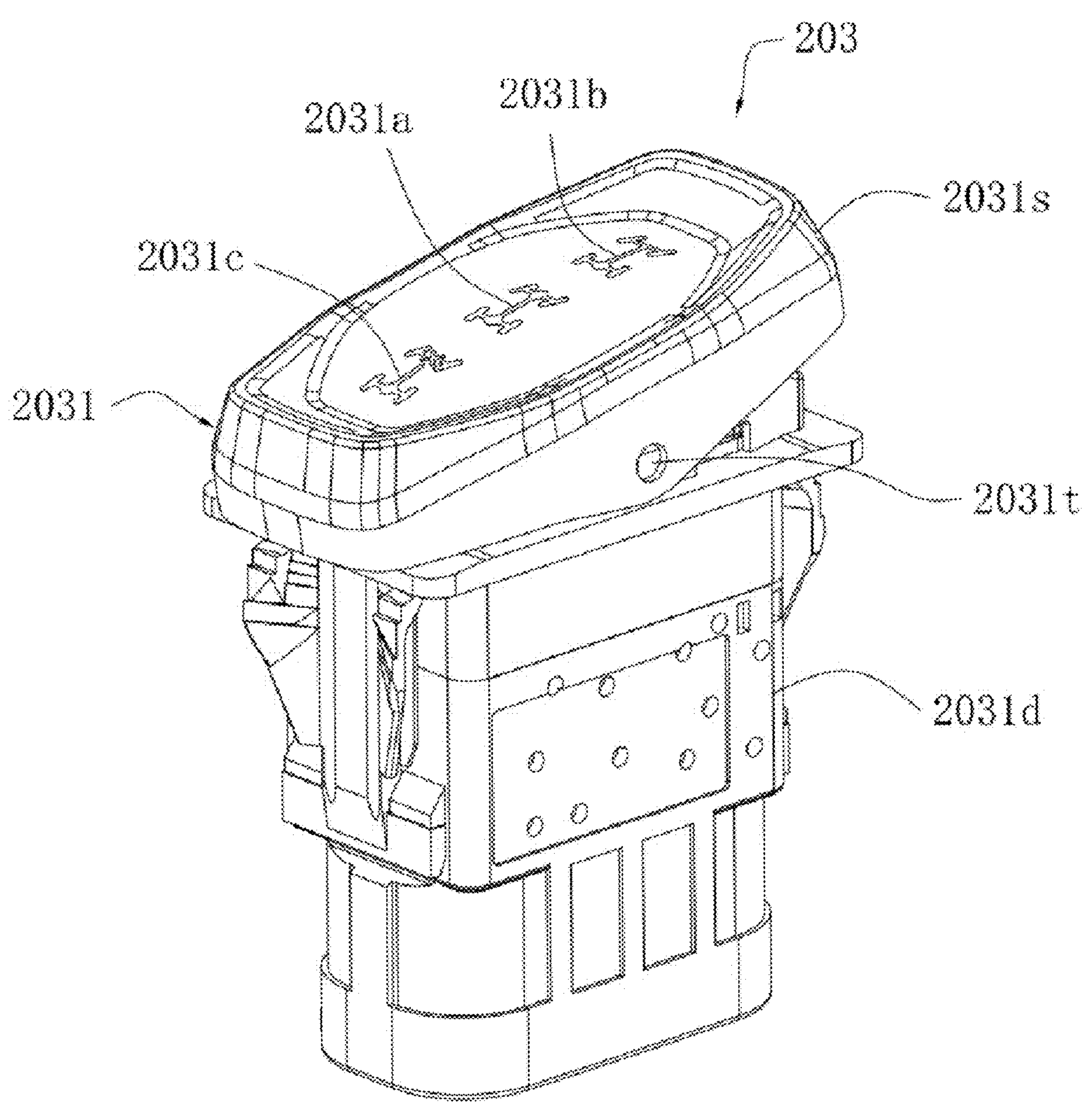
FIG. 24 is a perspective view of the improved mode switch.
Figure 25:
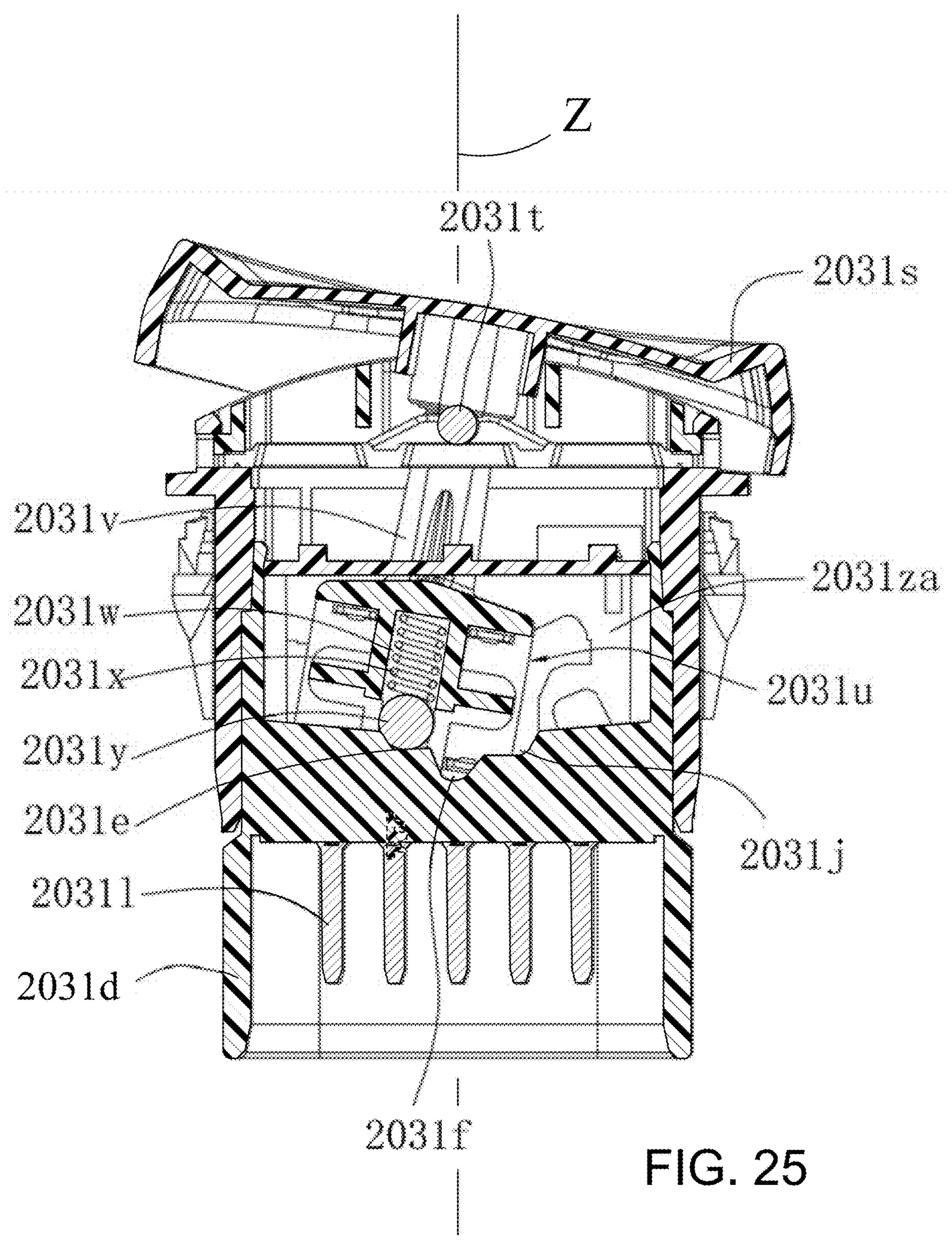
FIG. 25 is a cross-sectional view of the mode switch of FIG. 24.

As better shown in FIGS. 24 and 25, the preferred mode switch 2031 includes images and positions for a four-wheeled drive gear 2031*a*, a two-wheeled drive gear 2031*b*, and a front-wheeled drive lock gear 2031*c*. The image and position for the four-wheeled drive gear 2031*a* is preferably located between the images and positions for the two-wheeled drive gear 2031*b* and the front-wheeled drive lock gear 2031*c*. The setting for the two-wheeled drive gear 2031*b* enables two-wheeled drive operation of the off-road vehicle 100. The setting for the four-wheeled drive gear 2031*b* enables four-wheeled drive operation of the off-road vehicle 100. The setting for the front-wheeled drive lock gear 2031*c* enables front differential locking of the off-road vehicle 100. The mode switch 2031 includes a housing 2031*d*, a pushing plate 2031*s*, a switch shaft 2031*v*, and a gear lever assembly 2031*u*. The housing 2031*d* includes a cavity 2031*za*, a first gear slot 2031*e*, a second gear slot 2031*f*, and a third gear slot 2031*j*. The first gear slot 2031*e*, the second gear slot 2031*f*, and the third gear slot 2031*j* are all located in the cavity 2031*za*. The second gear slot 2031*f* is located between the first gear slot 2031*e* and the third gear slot 2031*j*. The pushing plate 2031*s* is rotatably connected to the housing 2031*d* by a switch pivot 2031*t*. One end of the gear lever shaft 2031*v* is connected to the pressing plate 2031*s*, and the other end of the gear lever shaft 2031*v* swings the gear lever assembly 2031*u* based on angular movement of the pressing plate 2031*s*, switching a plunger ball 2031*y* between the first gear slot 2031*e*, the second gear slot 2031*f*, and the third gear slot 2031*j*.

The gear lever assembly 2031*u* defines a plunger cavity 2031*w* which houses a spring 2031*x* and at least part of the plunger ball 2031*y*. The spring 2031*x* biases the plunger ball 2031*y* downwardly, pushing the ball 2031*y* into the first gear slot 2031*e*, the second gear slot 2031*f*, or the third gear slot 2031*j*.

Figures 26, 27:
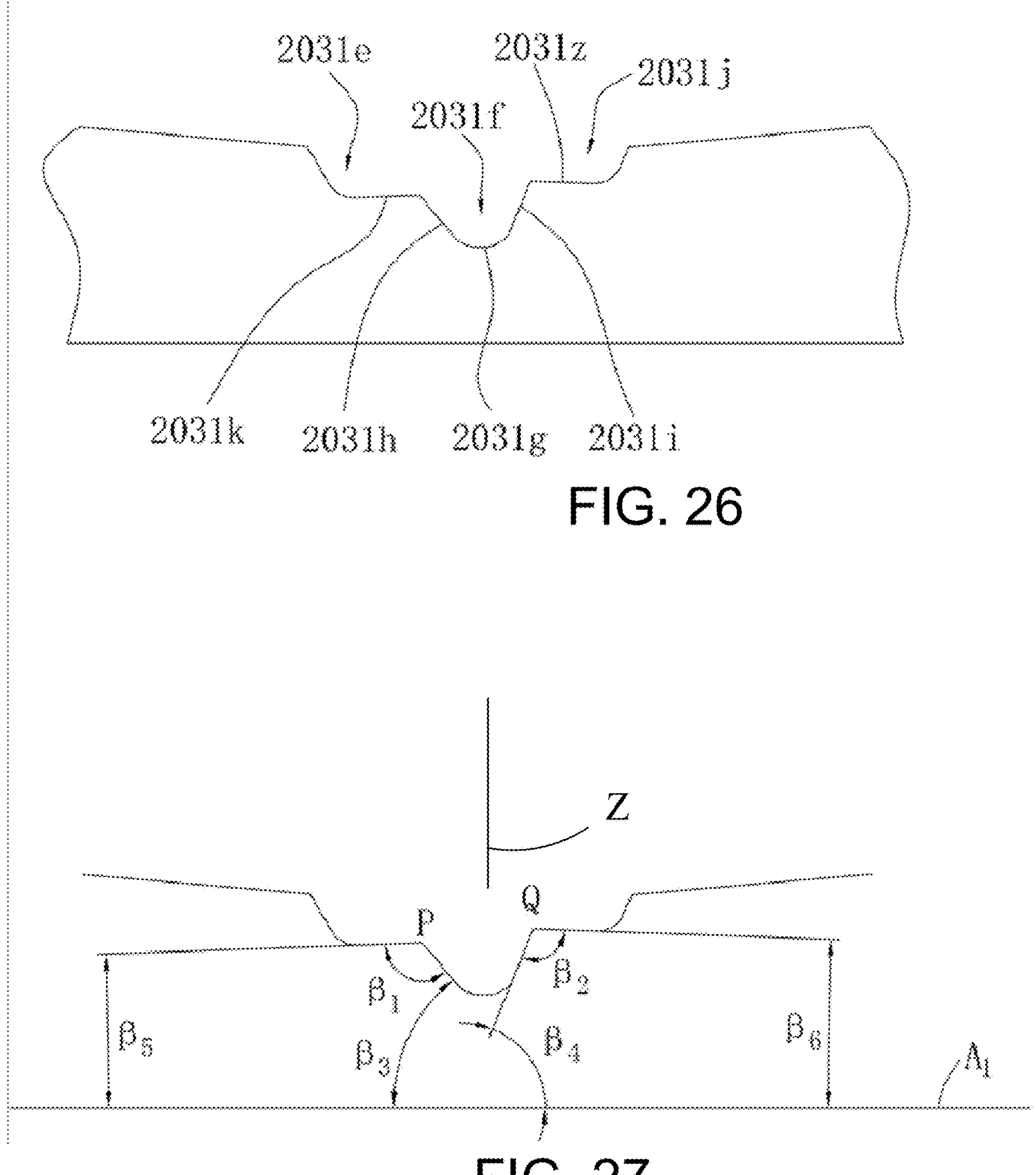
FIG. 26 is a schematic side view of the plunger ball slots of the mode switch of FIGS. 24 and 25.
FIG. 27 is a schematic side view calling out the angular relationships of FIG. 26.

As better shown in FIGS. 26 and 27, the first gear slot 2031*e*, the second gear slot 2031*f*, and the third gear slot 2031*j* are each at least partially arc-shaped, and sequentially connected. More particularly for the most preferred embodiment, the second gear slot 2031*f* includes an arc-shaped bottom section 2031*g* between a first sloping straight section 2031*h*, and a second sloping straight section 2031*i*. The first gear slot 2031*e* includes a flat straight section 2031*k*, and the third gear slot 2031*j* includes a flat straight section 2031*z*. The flat straight section 2031*k* of the first gear slot 2031*e* intersects with the first sloping straight section 2031*h*, creating a first intersection point P and a first angle $\beta 1$. The flat straight section 2031*z* of the third gear slot 2031*j* intersects with the second sloping straight section 2031*i*, creating a second intersection point Q and a second angle $\beta 2$. Angles $\beta 1$ and $\beta 2$ are preferably different. For instance, the first angle $\beta 1$ is preferably in the range from 120° to 140°, and the second angle $\beta 2$ is preferably in the range from 100° to 125°, with the difference between $\beta 1$ and $\beta 2$ preferably in the range from 5° to 30°. That is to say, the slope of the second gear slot 2031*f* near the third gear slot 2031*j* is preferably larger than the slope of the second gear slot 2031*f* near the first gear slot 2031*e*. The transition between the first gear slot 2031*e* and the second gear slot 2031*f* is smoother than the transition between the second gear slot 2031*f* and the third gear slot 2031*j*. In this way, when switching, the damping of switching lever 2031*v* from the second gear slot 2031*f* to the third gear slot 2031*j* is larger than the damping of switching lever 2031*v* from the first gear slot 2031*e* to the second gear slot 2031*f*. That is to say, the force values required for switching between switch positions are different. The force value required becomes larger when switching from four-wheeled drive to front-wheeled drive lock, helping to avoid unintended direct switching from two-wheeled drive gear to front-wheeled drive lock, improving safety.

In the most preferred embodiment, the position of the second intersection point Q is relatively higher than the position of the first intersection point P along the axis Z direction of the cavity 2031*za*. In this way, the spring plunger stroke from the second gear slot 2031*f* to the third gear slot 2031*j* is increased, so damping is increased from four-wheeled drive to the front-wheeled drive lock, thereby helping to avoid over-shifting during the switching process.

Further, the first sloping straight section 2031*h* is at a third angle β3 measured relative to a base plane A1, and the second sloping straight section 2031*i* is at a fourth angle β4 measured relative to the base plane A1. The difference between the fourth angle β4 and the third angle β3 is preferably in the range from 5° to 30°. The third angle β3 is preferably in the range from 45° to 60°. The fourth angle β4 is preferably in the range from 55° to 75°. Therefore, the slope of the second sloping straight section 2031*i* with respect to the plane A1 is larger than the slope of the first sloping straight section 2031*h* with respect to the plane A1. Therefore, the force value required for the plunger ball 2031*y* to switch from the second gear slot 2031*f* to the third gear slot 2031*j* is increased.

In the most preferred embodiment, the flat straight section 2031*k* is at a fifth angle β5 with respect to the base plane A1, and the flat straight section 2031*z* is at a sixth angle β6 with respect to the base plane. The value of the fifth angle β5 is preferably the same as the value of the sixth angle β6. In this way, the operating force value of switching from two-wheeled drive to four-wheeled drive may be basically equal to the operating force value of switching from front-drive lock to four-wheeled drive, thereby improving the consistency of operation.

As best shown in FIG. 25, the switch 2031 preferably has a plurality of output contacts 2031*l* accessible on a bottom side of the housing 2031*d*. The bottom side of the housing 2031*d* mates with a butt connection socket 2031*n* shown in FIG. 28 to electrically connect the output contacts 2031*l* through the harness 2042 to the ECU 21. The butt connection socket 2031*n* preferably includes a connection cover 2031*m* which surrounds a portion of the housing 2031*d* and additionally protects the output contacts 2031*l*. The butt connection socket 2031*n* is preferably provided with a sealing member 2031*q* formed of a soft, deformable material such as rubber or silicone, which can alternatively be provided on the housing 2031*d*. After the housing 2031*d* is plugged into the butt connection socket 2031*n*, the sealing member 2031*q* (shown in its uncompressed state in dashed lines) seals the gap between the butt connection socket 2031*n* and the housing 2031*d*, so that the output contacts 2031*l* are in a sealed state, avoiding the possibility of short-circuiting due to water and the like. At the same time, during the plugging act, the connection cover 2031*m* plays a guiding role, which is beneficial to the connection of the butt connection socket 2031*n* and the switch 2031, and assembly is more convenient.

Figure 28:
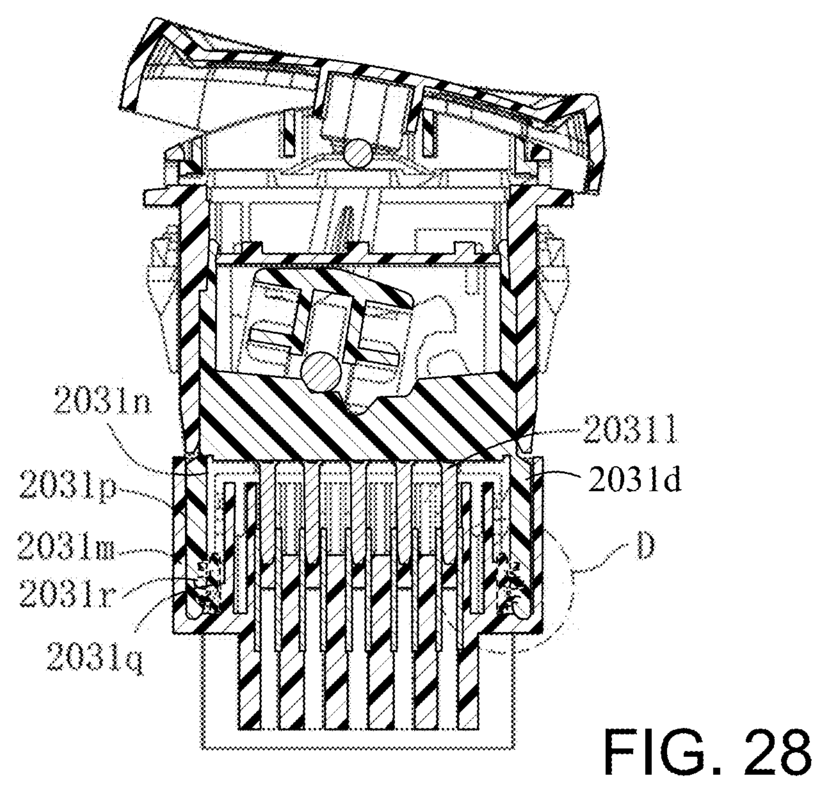
FIG. 28 is a cross-sectional view of the connection between the mode switch and the butt connection socket.
Figure 29:
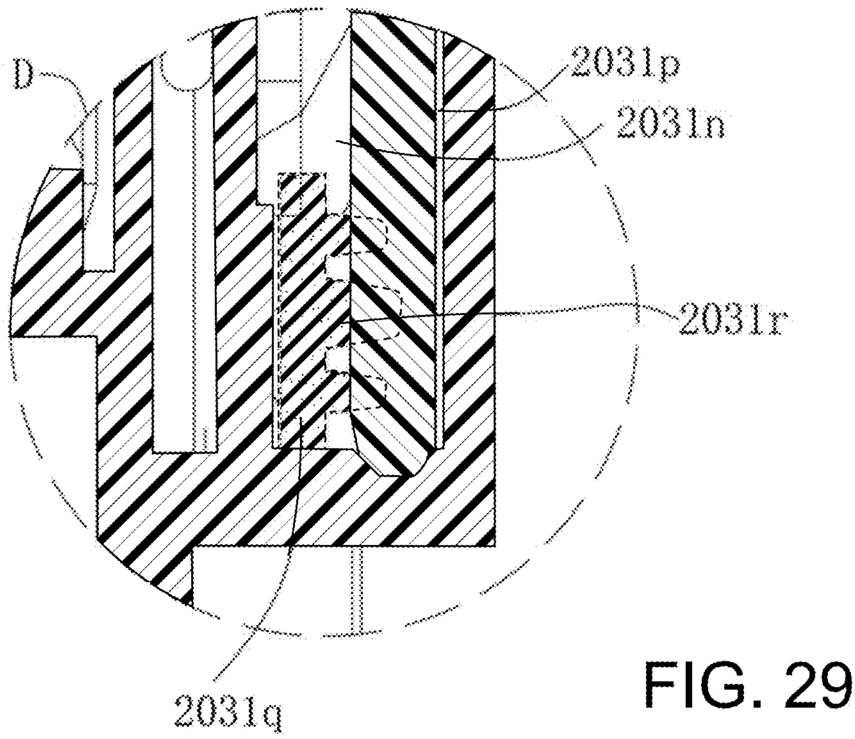
FIG. 29 is an enlarged view of part D in FIG. 28.

In the preferred embodiment shown in FIGS. 28 and 29, the sealing member 2031*q* is disposed within a slot 2031*p* at a bottom of the connection cover 2031*m*. The sealing is not only realized by the seal 2031*q*, but also by covering the butt connection socket 2031*n* by the connecting cover 2031*m*, thereby increasing the sealing path and improving the sealing effect. The sealing member 2031*q* may include one or a plurality of annular sealing protrusions 2031*r* extending outwardly. The plurality of sealing protrusions 2031*r* are preferably provided at intervals along the axial direction of the slot 2031*p*. In other embodiments, the sealing member 2031*q* may alternatively be directly inwardly from the connection cover 2031*m*, or may alternatively be directed inwardly or outwardly on the switch housing 2031*d*.

Referring back to FIG. 23, the electrical components 19 includes a battery 1922 and an electrical terminal assembly 204. The battery 1922 may be mounted on the middle frame portion 1112 for storing electricity for the vehicle 100. Alternatively, the battery 1922 could be mounted on the front frame portion 1111 or the rear frame portion 1113. The electrical terminal assembly 204 is electrically connected to the battery 1922 such as through the wiring harness 2042 at a location spaced away from the battery 1922 such as on a different frame portion. For instance, with the battery 1922 mounted on the middle frame portion 1112, the electrical terminal assembly 204 may be mounted on the front frame portion 1111. The purpose of the electrical terminal assembly 204 is to provide a convenient location for electrical connections to supply electricity to aftermarket accessories added to the off-road vehicle 100. By providing such a convenient connection location, electrical aftermarket accessories can be added and wired without any splicing or other damage to the original wiring of the off-road vehicle 100.

Figure 30:
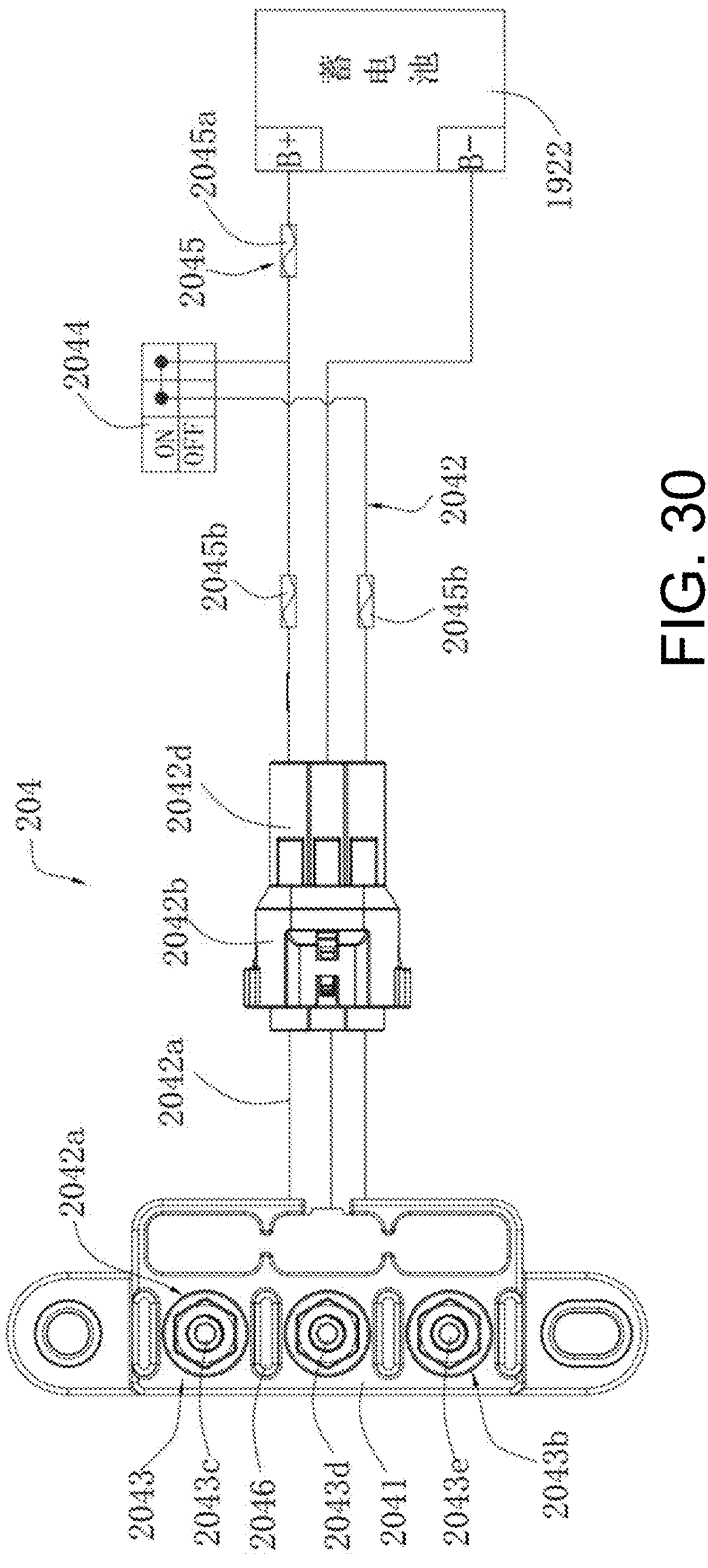
FIG. 30 is a partially side, partially schematic view of the preferred electrical terminal assembly as connected into the electrical system of FIG. 23.
Figure 31:
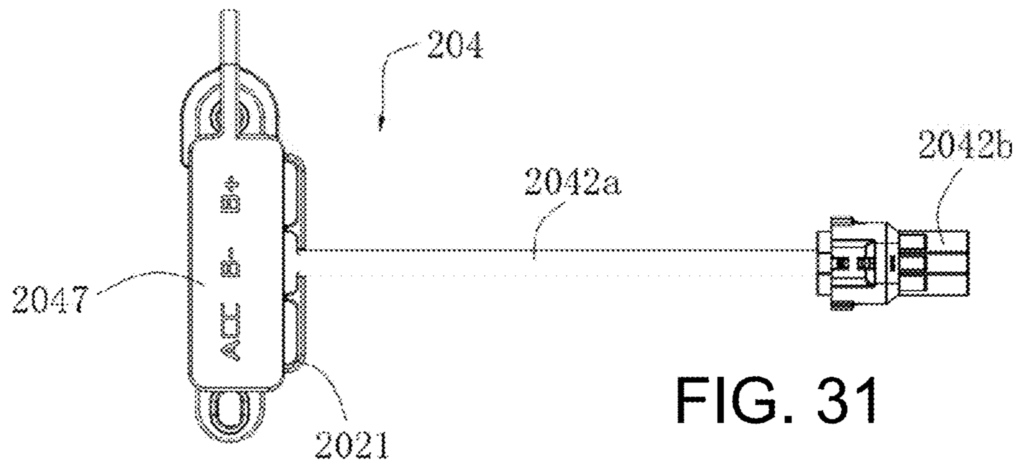
Figure 32:
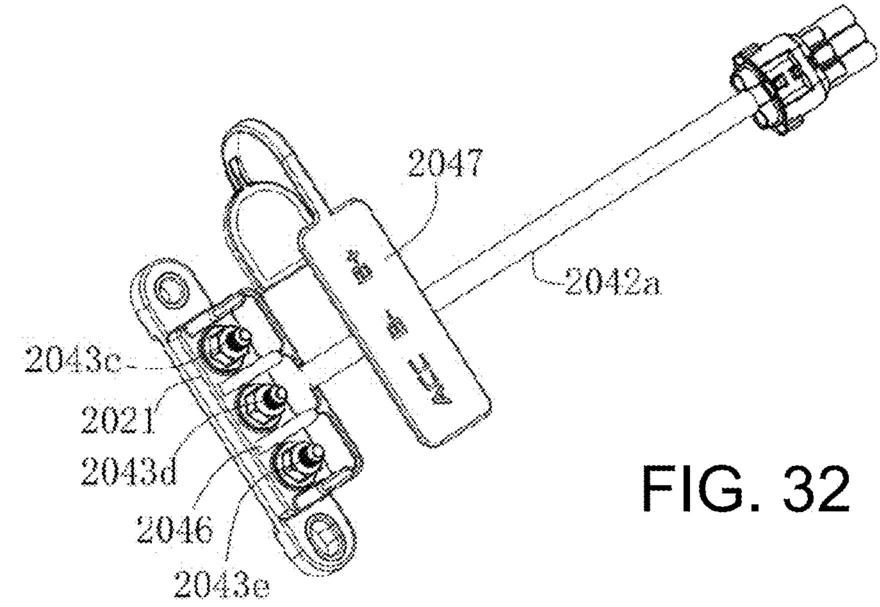
FIG. 32 is an exploded perspective view of the electrical terminal assembly of FIGS. 30 and 31.
Figure 33:
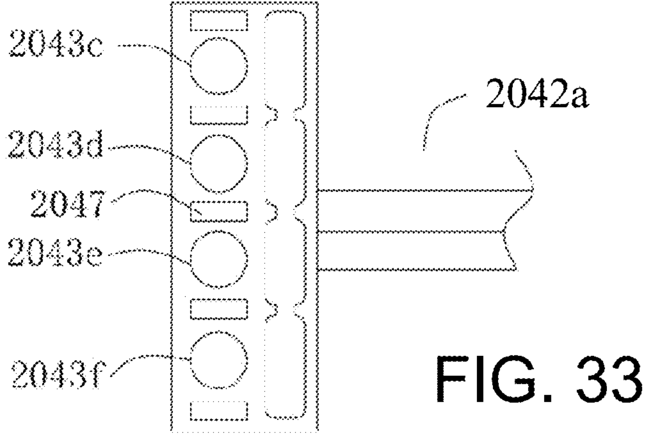
FIG. 33 is a schematic side view of an electrical terminal assembly according to another embodiment.

The preferred electrical terminal assembly 204 is better shown in FIGS. 30-32. The electrical terminal assembly 204 preferably includes a terminal block 2021 with a cover 2047, and a harness 2042*a*. The electrical terminal assembly 204 is connected to the battery 1922 through the wiring harness 2042, which includes a power relay 2044. The opening/closing of the power relay 2044 corresponds to the starting/key position of the off-road vehicle 100. That is to say, the power relay 2044 is turned on when the off-road vehicle 100 is started or powered on, and the power relay 2044 is turned off when the off-road vehicle 100 is turned off. The terminal block 2041 includes a battery positive (B+) terminal 2043*c*, a battery negative (B−) terminal 2043*d*, and an accessory (ACC) terminal 2043*e*. The B+ terminal 2043*c* and B-terminal 2043*d* have direct electrical connections to corresponding terminals of the battery 1922 through the wiring harnesses 2042*a* and 2042. The connection of the ACC terminal 2043*e* to the positive terminal of the battery 1922 runs through the power relay 2044. The ACC terminal 2043*e* conducts with the positive electrode of the battery 1922 when the power relay 2044 is turned on, and the ACC terminal 2043*e* is disconnected from the positive electrode of the battery 1922 when the power relay 2044 is turned off. In this way, if one or more aftermarket accessories need continuous electricity power supply, the accessories can be connected to the B+ and B− terminals 2043*c*, 2043*d* that are not controlled by the power relay 2044. If the electricity supply of one or more aftermarket accessories needs to be controlled by the starting/key position of the off-road vehicle 100, such accessories can be connected to the ACC and B− terminals 2043*d*, 2043*e* so their power is controlled by the power relay 2044. If desired, in addition to aftermarket electrical accessories, the terminal assembly 204 can also be used to supply electricity to original equipment components, such as headlights, taillights, etc.

FIG. 34 shows an alternative embodiment which further includes a second ACC terminal 2043*f*. Of course, the numbers of each of the B+, B− and ACC terminals may be one, two, three, four or other, respectively. The connection between the terminal block 2041, the power relay 2044 and the battery 1922 may be a combination of the above two embodiments, or one of the above two embodiments or others according to actual needs, and this is not limited.

As shown in FIG. 30, the wiring harness 2042 preferably includes one or more fuse boxes 2045 for protecting the battery 1992, so as to avoid the problem of feeding the battery 1922. In the most preferred embodiment, the fuse boxes 2045 include a main fuse 2045*a* and a plurality of sub-fuses 2045*b*. The main fuse 2045*a* is close to the positive electrode of the battery 1922. One of the sub-fuses 2045*b* is on the connection between the terminal block 2041 and the positive electrode of battery 1922. The other sub-fuse 2045*b* is on the connection between the terminal block 2041 and the power relay 2044. In the embodiment shown in FIG. 30, the main fuse 2045*a* and the sub-fuses 2045*b* are both on the harness 2042, with the main fuse 2045*a* and one of the sub-fuses 2045*b* provided in series, so as to achieve dual protection and further to avoid the feeding problem of the battery 1922. Alternatively, the sub-fuses 2045*b* may be provided in the harness 2042*a* of the electrical terminal assembly 204. As another alternative, only one sub-fuse may be provided, either in harness 2042 or harness 2042*a*.

The cover 2047 is used to protect the wiring terminals 2043, thereby avoiding the short circuit phenomenon of the wiring terminals 2043 caused by falling metal objects. The terminal block 2021 also preferably includes barrier plates 2046 between adjacent terminals 2043. Two adjacent wiring terminals 2043 are thus isolated by one barrier plate 2046 to avoid interference and/or shorting between the two adjacent wiring terminals 2043. Here, the barrier plates 2046 and the housing of the terminal block 2021 may be integrated.

As shown in FIG. 30, the end of the wiring harness 2042*a* of the electrical terminal assembly 204 is preferably provided with a wiring male plug 2042*b*. The end of the wiring harness 2042 is preferably provided with a wiring female plug 2042*d*. The wiring male plug 2042*b* may be plugged or unplugged with the wiring female plug 2042*d*, so that the electrical connection between the terminal block 2021 and the battery 1922 can be easily realized or separated. During connection of the aftermarket accessory to the terminals 2043*c*, 2043*d*, 2043*e* of the electrical terminal assembly 204, the user can unplug the plugs 2042*b*, 2042*d*, so neither of the terminals 2043*c*, 2043*e* are hot and any shorting or sparking possibility is eliminated. In this way, the terminal block 2021 and the wiring harness 2042 on the battery 1922 may be integrated, and the wiring can be very simple and convenient.

The above-mentioned embodiments only represent several embodiments of the present invention, and the descriptions thereof are specific and detailed, but should not be construed as a limitation on the scope of the invention. Workers of ordinary skill in the art may make numerous modifications and improvements without departing from the concepts of the present invention. Therefore, the protection scope of the patent of the present invention is defined to include the full breadth of the appended claims.

What is claimed is:

1. An off-road vehicle comprising:

a frame comprising:

a front frame portion located toward a front end of the off-road vehicle;

a rear frame portion located toward a rear end of the off-road vehicle; and a middle frame portion arranged between the front frame portion and the rear frame portion, wherein the middle frame portion comprises:

horizontal beams comprising at least a first cross beam and a second cross beam, the first cross beam and the second cross beam defining a plane S; and at least one sloping longitudinal beam running between the horizontal beams, the at least one sloping longitudinal beam comprising a first rod and a second rod, one end of the first rod being connected to the first cross beam, and the other end of the first rod extending upward and toward the second cross beam; one end of the second rod being connected to the second cross beam, and the other end of the second rod extending upward toward the first cross beam and being connected to the first rod;

wherein an angle A1 between the first rod and the plane S is in the range from 5° to 15°; and wherein an angle A2 between the second rod and the plane S is in the range from 5° to 15°.

2. The off-road vehicle of claim 1, wherein the angle A1 is greater than the angle A2.

3. The off-road vehicle of claim 1, wherein the first rod is welded to the second rod.

4. The off-road vehicle of claim 1, wherein the sloping longitudinal beam comprises a plurality of first rods and a plurality of second rods, wherein all the first rods are parallel, and wherein all the second rods are parallel.

5. The off-road vehicle of claim 1, wherein the first rod is welded to the first cross beam, and the second rod is welded to the second cross beam.

6. The off-road vehicle of claim 1, wherein the middle frame portion further comprises two longitudinal reinforcement pipes, wherein one end of each longitudinal reinforcement pipe is fixed to the first cross beam and the other end is fixed to the second cross beam, and wherein the at least one sloping longitudinal beam is at least partially located between the two longitudinal reinforcement pipes.

7. The off-road vehicle of claim 6, wherein the front frame portion comprises a first pillar, one end of the first pillar being connected to the first cross beam, and the other end of the first pillar extending upward;

wherein the rear frame portion comprises a second pillar, one end of the second pillar being connected to the second cross beam, and the other end of the second pillar extending upward; and wherein a first reinforcement rod, a second reinforcement rod, and a reinforcement plate are disposed between the rear frame portion and the middle frame portion, one end of the first reinforcement rod being connected to the longitudinal reinforcement pipe, the other end of the first reinforcement rod being connected to the second pillar, one end of the second reinforcement rod being connected to a support bracket in the rear frame portion, the other end of the second reinforcement rod being connected to the second pillar, one end of the reinforcement plate being connected to the first reinforcement rod, and the other end of the reinforcement plate extending towards the rear end of the off-road vehicle, crossing the second pillar, and being connected to the second reinforcement rod.

8. The off-road vehicle of claim 7, wherein the first reinforcement rod is welded to the second pillar;

wherein the second reinforcement rod is welded to the second pillar; and wherein the reinforcement plate is welded to the first reinforcement rod and the second reinforcement rod respectively.

9. The off-road vehicle of claim 6, wherein the middle frame portion further comprises a cross reinforcement pipe disposed between corresponding longitudinal beam and corresponding longitudinal reinforcement pipe, one end of the cross reinforcement pipe being connected to the longitudinal beam, and the other end being connected to the longitudinal reinforcement pipe.

10. An off-road vehicle comprising:

a frame comprising:

a front frame portion located toward a front end of the off-road vehicle;

a rear frame portion located toward a rear end of the off-road vehicle; and a middle frame portion arranged between the front frame portion and the rear frame portion, wherein the middle frame portion comprises:

horizontal beams comprising at least a first cross beam and a second cross beam, the first cross beam and the second cross beam defining a plane S; and at least one sloping longitudinal beam running between the horizontal beams, the at least one sloping longitudinal beam comprising a first rod and a second rod, one end of the first rod being connected to the first cross beam, and the other end of the first rod extending upward and toward the second cross beam; one end of the second rod being connected to the second cross beam, and the other end of the second rod extending upward toward the first cross beam and being connected to the first rod;

wherein an angle A1 between the first rod and the plane S is in the range from 5° to 15°; and wherein an angle A2 between the second rod and the plane S is in the range from 5° to 15°, such that a bottom of the middle frame portion protrudes upwards.

11. The off-road vehicle of claim 10, wherein the angle A1 is greater than the angle A2.

12. The off-road vehicle of claim 10, wherein the first rod is welded to the second rod, wherein the first rod is welded to the first cross beam, and wherein the second rod is welded to the second cross beam.

13. The off-road vehicle of claim 10, wherein the sloping longitudinal beam comprises a plurality of first rods and a plurality of second rods, wherein all the first rods are parallel, and wherein all the second rods are parallel.

14. The off-road vehicle of claim 10, wherein the middle frame portion further comprises at least two longitudinal reinforcement pipes, wherein one end of each longitudinal reinforcement pipe is fixed to the first cross beam, and the other end is fixed to the second cross beam; and wherein the sloping longitudinal beam is at least partially located between the two longitudinal reinforcement pipes.

15. An off-road vehicle comprising:

a frame comprising:

a front frame portion located toward a front end of the off-road vehicle;

a rear frame portion located toward a rear end of the off-road vehicle; and a middle frame portion arranged between the front frame portion and the rear frame portion, wherein the middle frame portion comprises:

horizontal beams comprising at least a first cross beam and a second cross beam, the first cross beam and the second cross beam defining a plane S; and at least one sloping longitudinal beam running between the horizontal beams, the at least one sloping longitudinal beam comprising a first rod and a second rod, one end of the first rod being connected to the first cross beam, and the other end of the first rod extending upward and toward the second cross beam; one end of the second rod being connected to the second cross beam, and the other end of the second rod extending upward toward the first cross beam and being connected to the first rod;

wherein an angle A1 between the first rod and the plane S is greater than an angle A2 between the second rod and the plane S.

16. The off-road vehicle of claim 15, wherein the first rod is welded to the second rod, wherein the first rod is welded to the first cross beam, and wherein the second rod is welded to the second cross beam.

17. The off-road vehicle of claim 15, wherein the sloping longitudinal beam comprises a plurality of first rods and a plurality of second rods, wherein all the first rods are parallel, and wherein all the second rods are parallel.

18. The off-road vehicle of claim 15, wherein a bottom of the middle frame portion protrudes upwards.

19. The off-road vehicle of claim 15, wherein the middle frame portion further comprises at least two longitudinal reinforcement pipes, wherein one end of each longitudinal reinforcement pipe is fixed to the first cross beam, and the other end is fixed to the second cross beam; and wherein the sloping longitudinal beam is at least partially located between the two longitudinal reinforcement pipes.

20. The off-road vehicle of claim 19, wherein the middle frame portion further comprises a cross reinforcement pipe disposed between corresponding longitudinal beam and corresponding longitudinal reinforcement pipe, one end of the cross reinforcement pipe being connected to the longitudinal beam, and the other end being connected to the longitudinal reinforcement pipe.

* * * * *